US010827397B2

(12) United States Patent
Wang

(10) Patent No.: US 10,827,397 B2
(45) Date of Patent: Nov. 3, 2020

(54) METHOD FOR INSERTING SMF AND AMF ENTITY

(71) Applicant: CHINA ACADEMY OF TELECOMMUNICATIONS TECHNOLOGY, Beijing (CN)

(72) Inventor: Hucheng Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/621,684

(22) PCT Filed: May 30, 2018

(86) PCT No.: PCT/CN2018/089014
§ 371 (c)(1),
(2) Date: Dec. 11, 2019

(87) PCT Pub. No.: WO2018/228192
PCT Pub. Date: Dec. 20, 2018

(65) Prior Publication Data
US 2020/0128450 A1  Apr. 23, 2020

(30) Foreign Application Priority Data

Jun. 12, 2017 (CN) .......................... 2017 1 0438960
Jan. 2, 2018 (CN) .......................... 2018 1 0001550

(51) Int. Cl.
*H04W 72/04* (2009.01)
*H04W 36/00* (2009.01)
(Continued)

(52) U.S. Cl.
CPC ...... *H04W 36/0033* (2013.01); *G06F 16/903* (2019.01); *H04W 72/042* (2013.01);
(Continued)

(58) Field of Classification Search
CPC .................................................. H04W 36/0033
See application file for complete search history.

(56) References Cited

U.S. PATENT DOCUMENTS

2019/0090164 A1* 3/2019 Ding ..................... H04W 76/11
2020/0015131 A1* 1/2020 Ying ..................... H04W 36/18

FOREIGN PATENT DOCUMENTS

CN       105792368 A    7/2016
EP       2702712 A2     3/2014
(Continued)

OTHER PUBLICATIONS

International Search Report issued for International Application No. PCT/CN2018/089014 dated Aug. 29, 2018.
(Continued)

*Primary Examiner* — Sulaiman Nooristany
(74) *Attorney, Agent, or Firm* — Ladas & Parry, LLP

(57) ABSTRACT

A method of inserting a Session Management Function SMF and an access and mobility management function AMF entity are provided. The method of inserting an SMF includes in a case that a User Equipment UE moves out of a service area of a first SMF entity currently serving a first Packet Data Unit PDU session of the UE, or in a case that selecting a SMF entity for the UE is needed, querying, by using information relevant to the UE, a second SMF entity capable of serving the UE; and updating the first PDU session by using the second SMF entity.

12 Claims, 11 Drawing Sheets

(51) Int. Cl.
  *H04W 76/15* (2018.01)
  *G06F 16/903* (2019.01)
  *H04W 88/04* (2009.01)
  *H04W 88/08* (2009.01)

(52) U.S. Cl.
  CPC ........... *H04W 76/15* (2018.02); *H04W 88/04* (2013.01); *H04W 88/08* (2013.01)

(56) References Cited

FOREIGN PATENT DOCUMENTS

| WO | WO 2012/148210 A2 | 11/2012 |
|----|-------------------|---------|
| WO | WO 2017/019118 A1 | 2/2017  |

OTHER PUBLICATIONS

Written Opinion issued for International Application No. PCT/CN2018/089014 dated Aug. 29, 2018.
International Preliminary Report on Patentability issued for International Application No. PCT/CN2018/089014 dated Dec. 17, 2019.
3GPP TR 23.799 V1.2.0, "3rd Generation Partnership Project; Technical Specification Group Services and System Aspects; Study on Architecture for Next Generation System (Release 14)," Nov. 2016, pp. 1-526.
Office Action and Search Report issued for Chinese Application No. 201810001550.3 dated Nov. 26, 2019.
Ericsson, SA WG2 Meeting #118BIS, S2-170141, "23.501: SMF selection," Jan. 16-20 2017, pp. 1-3.
Ericsson, Huawei?, CATT?, SA WG2 Meeting #118BIS, S2-170594, "23.501: SMF selection," Jan. 16-20, 2017, pp. 1-4.
Ericsson, Huawei, CATT, SA WG2 Meeting #118BIS, S2-170620, "23.501: SMF selection," Jan. 16-20, 2017, pp. 1-3.
Ericsson, Huawei, CATT, SA WG2 Meeting #118BIS, S2-170679, Jan. 16-20, 2017, "23.501: SMF selection," pp. 1-3.
Ericsson, SA WG2 Meeting #121, S2-173006, "23.501: SMF Service Areas," May 15-19, 2017, pp. 1-13.
Qualcomm Incorporated, SA WG2 Meeting #121, S2-173106, "TS 23.502: handling of PDU sessions at slice unavailability," May 15-19, 2017, pp. 1-33.
"TS 23.501: Network topology consideration" S2-173135, 3GPP TSG SA WG2 Meeting #121, May 15-19, 2017, Hangzhou, China.
"TS 23.501: Consideration on SMF selection at PDU session establishment", S2-173189, SA WG2 Meeting #121, May 15-19, 2017, Hangzhou, China.
"TS 23.501: SMF Management due to far mobility", S2-173469, SA WG2 Meeting #S2-121, May 29-Jun. 2, 2017, Hangzhou, China.
Extended European Search Report from EP app. No. 18818808.0, dated Feb. 14, 2020.

* cited by examiner

METHOD FOR INSERTING SMF AND AMF ENTITY

CROSS-REFERENCE TO RELATED APPLICATIONS

This application is U.S. national phase application of PCT Application No. PCT/CN2018/089014 filed on May 30, 2018, which claims priorities to a Chinese Patent Application No. 201710438960.X filed in China on Jun. 12, 2017 and a Chinese Patent Application No. 201810001550.3 filed in China on Jan. 2, 2018, the disclosures of which are incorporated in their entireties by reference herein.

TECHNICAL FIELD

The present disclosure relates to the field of communication technology, and, in particular, relates to a method of inserting a Session Management Function (SMF) and an Access and Mobility Management Function (AMF) entity.

BACKGROUND

Since a service area provided by a User Plane Function (UPF) entity in a 5th Generation (5G) mobile communication system is limited, i.e., the number of Access Network (AN) nodes to which the UPF entity may directly connect is limited and the number of UPF entities controllable by the Session Management Function (SMF) entity in a control plane is also limited, a service area that may be provided by the SMF entity is limited. In a case that movement of a User Equipment (UE) causes the UE to move out of a service area of an anchor UPF entity, an intermediate UPF entity for relaying forwarding of user plan; data needs to be inserted between an AN node and the anchor UPF entity. However, in a case that the intermediate UPF entity is not within a service area of a current SMF entity, a network further needs to establish a signaling connection to a SMF entity serving the intermediate UPF entity, so as to insert the intermediate SMF entity.

Two methods for inserting an intermediate SMF are proposed in the 3rd Generation Partnership Project (3GPP).

A first method is to select an intermediate SMF entity by the Access and Mobility Management Function (AMF) entity. The AMF entity selects a SMF entity through a network function repository function (NF Repository Function, NFR) entity, and uses a position (a Tracking Area, TA) and a digital data network (DNN) where the UE currently locates as a query condition. In a case that the NRF entity returns a SMF entity, the SMF entity is determined as an anchor SMF entity. If the NRF entity cannot find a SMF entity satisfying the condition, the SMF entity is searched by using the TA and the DNN respectively where the HE is currently located, and a SMF entity serving a current TA is determined as the intermediate SMF entity, and a SMF entity serving a current DNN is determined as the anchor SMF entity. However, in this method, in order to avoid a case in which the SMF entity is queried every time a position of the UE is updated, the service area of the AMF entity and the service area of the SMF entity are required to be consistent, which proposes a deployment limitation. However, in a case that the AMF entity uses TA information and DNN information of the UE to query the SMF entity every time the position of the UE changes, a large number of unnecessary query operations are brought in and a delay is increased in a service request process.

A second method is to select the intermediate SMF entity by the anchor SMF entity. The anchor SMF entity selects the intermediate SMF entity according to location information of the UE, and an insertion of the intermediate SMF entity is completely transparent to the AMF entity, and signaling messages between all AMF entities and the intermediate SMF entity are relayed by the anchor SMF entity. However, in this method, since the insertion of the intermediate SMF entity is completely transparent to the AMF entity, the signaling messages between all AMF entities and the intermediate SMF entity are relayed by the anchor SMF entity, thus causing a redundancy of a signaling transmission path, and increasing a delay of a signaling processing flow.

SUMMARY

The present disclosure provides a method of inserting an SMF and an AMF entity, so as to solve a problem that an intermediate SMF cannot be inserted into effectively in the method of inserting an intermediate SMF.

In a first aspect, a method of inserting a Session Management Function (SMF) is provided. The method is applied for an Access and Mobility Management Function (AMF) entity and includes: in a case that a User Equipment (UE) moves out of a service area of a first SMF entity currently serving a first Packet Data Unit (PDU) session of the UE, or in a case that selecting a SMF entity for the UE is needed, querying, by using information relevant to the UE, a second SMF entity capable of serving the UE; and updating the first PDU session by using the second SMF entity.

Optionally, in a case that the UE moves out of the service area of the first SMF entity currently serving the first PDU session of the UE, or in a case that selecting a SMF entity for the UE is needed, querying, by using information relevant to the UE, the second SMF entity capable of serving the UE, includes: according to information provided by the first SMF entity, determining that the UE moves out of the service area of the first SMF entity, or determining that selecting a SMF entity for the UE is needed; and querying, using the information relevant to the UE, the second SMF entity capable of serving the UE.

Optionally, before in a case that the UE moves out of the service area of the first SMF entity currently serving the first PDU session of the UE, or in a case that selecting a SMF entity for the UE is needed, querying, by using information relevant to the UE, the second SMF entity capable of serving the UE, the method further includes: receiving a registration request message sail by the UE, or receiving a handover request or a path switch request message sent by a base station serving the UE; and determining information of the First PDU session of the UE, wherein the information of the first PDU session includes an identifier (ID) of the first SMF entity.

Optionally, the method further includes providing location information of the UE to the first SMF entity.

Optionally, the first SMF entity includes an anchor SMF entity or a first intermediate SMF entity.

Optionally, according to the information provided by the first SMF entity, determining that the UE moves out of the service area of the first SMF entity, or determining that selecting a SMF entity for the UE is needed includes: according to indication information provided by the anchor SMF entity, determining that the UE moves out of a service area of the anchor SMF entity, or determining that selecting a SMF entity for the UE is needed; or according to indication information provided by the first intermediate SMF entity, determining that the UE moves out of a service area of the first intermediate SMF entity, or determining that selecting a SMF entity for the UE is needed; or according to information of a service area of the first intermediate SMF entity and location information of the UE provided by the first intermediate SMF entity, determining that the UE moves out of the service area of the first intermediate SMF entity, or determine that selecting a SMF entity for the UE is needed.

Optionally, the indication information provided by the anchor SMF entity is determined, according to location information of the UE provided by the AMF entity and information of the service area of the anchor SMF entity, by the anchor SMF entity; the indication information provided by the first intermediate SMF entity is determined by the first intermediate SMF entity according to the location information of the UE provided by the AMF entity and the information of the service area of the first intermediate SMF entity.

Optionally, querying, by using the information relevant to the UE, the second SMF entity capable of serving the UE, includes: querying a Network Repository Function (NRF) entity and obtaining information of the second SMF entity, by using the information relevant to the UE; and determining the second SMF entity according to the information of the second SMF entity.

Optionally, in a case that a registration request message sent by the UE is further received, or a handover request or a path switch request message sent by a base station serving the UE is received, the method further includes: determining that the second SMF entity is serving the UE in a network; and judging whether the second SMF entity is still able to serve the UE or not; wherein, in a case that the second SMF entity is still able to serve the UE, and if an anchor SMF entity of the first PDU session differs from the second SMF entity, then the second SMF entity is inserted into the first PDU session: in a case that the second SMF entity is unable to continue providing the service, a third SMF entity capable of serving the UE is queried, and the third SMF entity is inserted into the first PDU session.

Optionally, the information of the first PDU session further includes information of a network slice to which the first PDU session belongs.

Optionally, in a case that a registration request message sent by the UE is further received, or a handover request or a path switch request message sent by a base station serving the UE is received, the method further includes: determining, according to information of a network slice to which the first PDU session belongs, that the second SMF entity is serving the UE in the network slice to which the first PDU session belongs; and judging whether the second SMF entity is still able to serve the UE or not; wherein, in a case that the second SMF entity is still able to serve the UE, and if an anchor SMF entity of the first PDU session differs from the second SMF entity, then the second SMF entity is inserted into the first PDU session, in a case that the second SMF entity is unable to continue providing the service, a fourth SMF entity capable of serving the UE is queried, and the fourth SMF entity is inserted into the first PDU session.

Optionally, the method further includes determining that the second SMF entity is serving the UE in a network; and in a case that the UE moves out of a service area of a fifth SMF entity currently serving a second PDU session of the UE, or in a case that selecting a SMF entity for the UE is needed, inserting the second SMF entity into the second PDU session.

Optionally, the method further includes determining information of a network slice to which the first PDU session belongs; determining, according to the information of the network slice to which the first PDU session belongs, that a second PDU session of the UE exists in the network slice to which the first PDU session belongs; determining that the second SMF entity is serving the UE in the network slice to which the first PDU session belongs; in a case that the UE moves out of a service area of a sixth SMF entity currently serving the second PDU session, or in a case that selecting a SMF entity for the UE is needed, inserting the second SMF entity into the second PDU session.

Optionally in a case that the UE moves out of the service area of the first SMF entity currently serving the first PDU session of the UE, or in a case that selecting a SMF entity for the UE is needed, querying, by using information relevant to the UE, the second SMF entity capable of serving the UE, includes: determining that the UE moves out of the service area of the first SMF entity according to information of the service area of the first SMF entity provided by a Network Repository Function (NRF) entity; and querying, by using the information relevant to the UE, the second SMF entity capable of serving the UE.

Optionally, determining that the UE moves out of the service area of the first SMF entity according to information of the service area of the first SMF entity provided by the NRF entity, includes: obtaining and storing the information of the service area of the first SMF entity provided by the NRF entity; and determining, according to the information of the service area of the first SMF entity during a registration update process, a service request process, or a handover process of the UE, that the UE moves out of the service area of the first SMF entity.

Optionally querying, by using the information relevant to the UE, the second SMF entity capable of serving the UE, includes: querying, using the information relevant to the UE, the NRF entity, and obtaining information of the second SMF entity; and determining, the second SMF entity according to the information of the second SMF entity.

Optionally, the information of the second SMF entity includes information of a service area of the second SMF entity; after determining the second SMF entity according to the information of the second SMF entity, the method further includes: storing the information of the service area of the second SMF entity, and deleting the information of the service area of the first SMF entity.

In a second aspect, some embodiments of the present disclosure further provide an Access and Mobility Management Function (AMF) entity. The AMF entity includes a query module, configured to, in a case that a User Equipment (UE) moves out of a service area of a first SMF entity currently serving a first Packet Data Unit (PDU) session of the UE, or in a case that selecting a SMF entity for the UE is needed, query, by using information relevant to the UE, a second SMF entity capable of serving the UE; and an update module, configured to update the first PDU session by using the second SMF entity.

Optionally, the query module includes: a determining unit, configured to according to information provided by the first SMF entity, determine that the UE moves out of the service area of the first SMF entity, or determine that selecting a SMF entity for the UE is needed; and a query unit, configured to query, using the information relevant to the UE, the second SMF entity capable of serving the UE.

Optionally, the AMF entity further includes a receiving module, configured to receive a registration request message sent by the UE, or receive a handover request or a path switch request message sent by a base station serving the UE; and a first determining module, configured to determine information of the first PDU session of the UE, wherein the information of the first PDU session includes an identifier (ID) of the first SMF entity.

Optionally, tire AMF entity further includes a transmitting module configured to provide location information of the UE to the first SMF entity.

Optionally, the first SMF entity includes an anchor SMF entity or a first intermediate SMF entity.

Optionally, the determining unit is specifically configured to: according to indication information provided by the anchor SMF entity, determine that the UE moves out of a service area of the anchor SMF entity, or determine that selecting a SMF entity for the UE is needed; or according to indication information provided by the first intermediate SMF entity, determine that the UE moves out of a service area of the first intermediate SMF entity, or determines that selecting a SMF entity for the UE is needed; or according to information of a service area of the first intermediate SMF entity and location information of the UE provided by the first intermediate SMF entity, determine that the UE moves out of the service area of the first intermediate SMF entity, or determine that selecting a SMF entity for the UE is needed.

Optionally, the indication information provided by the anchor SMF entity is determined, according to location information of the UE provided by the AMF entity and information of the service area of the anchor SMF entity, by the anchor SMF entity; the indication information provided by the first intermediate SMF entity is determined by the first intermediate SMF entity according to the location information of the UE provided by the AMF entity and the information of the service area of the first intermediate SMF entity.

Optionally, the query module is specifically configured to; query a Network. Repository Function (NRF) entity and obtain information of the second SMF entity, by using the information relevant to the UE; and determine the second SMF entity according to the information of the second SMF entity.

Optionally, the AMF entity further includes a second determining module, configured to determine that the second SMF entity is serving the UE in a network in a case that a registration request message sent by the UE is further received or a handover request or a path switch request message sent by a base station serving the UE is received; a first judging module, configured to judge whether the second SMF entity is still able to sere the UE; a first inserting module, configured to in a case that the second SMF entity is still able to serve the UE, and if an anchor SMF entity of the lint PDU session differs from the second SMF entity, then insert the second SMF entity into the first PDU session; and a second inserting module, configured to in a case that the second SMF entity is unable to continue providing the service, query a third SMF entity capable of serving the UE, and insert the third SMF entity into the first PDU session.

Optionally, the information of the first PDU session. Further includes information of a network slice to which the first PDU session belongs.

Optionally, the AMF entity further includes a third determining module configured to in a case that a registration request message sent by the UE is further received, or a handover request or a path switch request message sent by a base station serving the UE is received, determine, according to information of a network slice to which the first PDU session belongs, that the second SMF entity is serving the UE in the network slice to which the first PDU session belongs; a second judging module configured to judge whether the second SMF entity is still able to serve the UE or not; a third inserting module configured to in a case that the second SMF entity is still able to serve the UE, and if an anchor SMF entity of the first PDU session differs from the second SMF entity, insert the second SMF entity into the first PDU session; and a fourth inserting module, configured to in a case that the second SMF entity is unable to continue providing the service, query a fourth SMF entity capable of serving the UE, and insert: the fourth SMF entity into the first PDU session.

Optionally, the AMF entity thither includes a fourth determining module configured to determine that the second SMF entity is serving the UE in a network; and a fifth inserting module configured to in a case that the UE moves out of a service area of a fifth SMF entity currently serving a second PDU session of the UE, or in a case that selecting a SMF entity for the UE is needed, insert the second SMF entity into the second PDU session.

Optionally, the AMF entity further include a fifth determining module configured to determine information of a network slice to which the first PDU session belongs; a sixth determining module configured to determine, according to the information of the network slice to which the first PDU session belongs, that a second PDU session of the UE exists in the network slice to which the first PDU session belongs; a seventh determining module configured to determine that the second SMF entity is serving the UE, in the network slice to which the first PDU session belongs; a sixth inserting module configured to, in a case that the UE moves out of a service area of a sixth SMF entity currently serving the second PDU session, or in a case that selecting a SMF entity for the UE is needed, insert the second SMF entity into the second PDU session.

In a third aspect, some embodiments of the present disclosure further provide an Access and Mobility Management Function (AMF) entity. The AMF entity includes a processor configured to: in a case that a User Equipment (UE) moves out of a service area of a first SMF entity currently serving, a first Packet Data Unit (PDU) session of the UE, or in a case that selecting a SMF entity for the UE is needed, query, by using information relevant to the UE, a second SMF entity capable of serving the UE; and update the first PDU session by using the second SMF entity.

Optionally, the processor is further configured to: according to information provided by the first SMF entity, determine that the UE moves out of the service area of the first SMF entity, or determine that selecting a SMF entity for the UE is needed and query, using the information relevant to the UE the second SMF entity capable of serving the UE.

Optionally, the AMF entity further includes: a receiver, configured to receive a registration request message sent by the UE, or receive a handover request or a path switch request message sent by a base station serving the UE; the processor is further configured to determine information of the first PDU session of the UE, wherein the information of the first PDU session includes an identifier (ID) of the first SMF entity.

Optionally, the AMF entity further includes a transmitter configured to provide location information of the UE to the first SMF entity.

Optionally, the first SMF entity includes an anchor SMF entity, or the first SMF entity further includes a first intermediate SMF entity.

Optionally, the processor is further configured to: according to indication information provided by the anchor SMF entity, determine that the UE moves out of a Service area of the anchor SMF entity, or determine that selecting a SMF entity for the UE is needed: or according to indication information provided by the first intermediate SMF entity, determine that the UE moves out of a service area of the first intermediate SMF entity, or determine that selecting a SMF entity for the UE is needed: or according to information of the service area of the first intermediate SMF entity and location information of the UE provided by the first intermediate SMF entity, determine that the UE moves out of the service area of the first intermediate SMF entity, or determine that selecting a SMF entity for the UE is needed.

Optionally, the indication information provided by the anchor SMF entity is determined, according to location information of the UE provided by the AMF entity and information of the service area of the anchor SMF entity, by the anchor SMF entity; the indication information provided by the first intermediate SMF entity is determined by the first intermediate SMF entity according to the location information of the UE provided by the AMF entity and the information of the service area of the first intermediate SMF entity.

Optionally, the processor is further configured to query a Network Repository Function (NRF) entity and obtain information of the second SMF entity, by using the information relevant to the UE; and determine the second SMF entity according to the information of the second SMF entity.

Optionally, the processor is further configured to: in a case that a registration request message sent by the UE is further received, or a handover request or a path switch request message sent by a base station serving the UE is received, determine that the second SMF entity is serving the UE in a network; judge whether the second SMF entity is still able to serve the UE or not; in a case that the second SMF entity is still able to serve the UE, and if an anchor SMF entity of the first PDU session differs from the second SMF entity, insert the second SMF entity into the first PDU session; in a case that the second SMF entity is unable to continue providing the service, query a third SMF entity capable of serving the UE, and insert the third SMF entity into the first PDU session.

Optionally, the information of the first PDU session further includes: information of a network slice to which the first PDU session belongs.

Optionally, the processor is further configured to: in a case that a registration request message sent by the UE is further received, or a handover request or a path switch request message sent by a base station serving the UE is received, determine, according to information of a network slice to which the first PDU session belongs, that the second SMF entity is serving the UE in the network slice to which the first PDU session belongs; judge whether the second SMF entity is still able to serve the UE or not; in a case that the second SMF entity is still able to serve the UE, and if an anchor SMF entity of the first PDU session differs from the second SMF entity, insert the second SMF entity into the first PDU session; in a case that the second SMF entity is unable to continue providing the service, query a fourth SMF entity capable of serving the UE, and insert the fourth SMF entity into the first PDU session.

Optionally, the processor is further configured to: determine that the second SMF entity is serving the UE in a network; in a case that the UE moves out of a service area of a fifth SMF entity currently serving a second PDU session of the UE, or in a case that selecting a SMF entity for the UE is needed, insert the second SMF entity into the second PDU session.

Optionally, the processor is further configured to: determine information of a network slice to which the first PDU session belongs; determine, according to the information of the network slice to which the first PDU session belongs, that a second PDU session of the UE exists in the network slice to which the first PDU session belongs; determine that the second SMF entity is serving the UE in the network slice to which the first PDU session belongs; in a case that the UE moves out of a service area of a sixth SMF entity currently serving the second PDU session, or in a case that selecting a SMF entity for the UE is needed, insert the second SMF entity into the second PDU session.

Optionally, the processor is further configured to: determine that the UE moves out of the service area of the first SMF entity according to information of the service area of the first SMF entity provided by a Network Repository Function (NRF) entity; and query, by using the information relevant to the UE, the second SMF entity capable of serving the UE.

Optionally, the processor is further configured to obtain and store the information of the service area of the first SMF entity provided by the NRF entity; and determine, according to the information of the service area of the first SMF entity during a registration update process, a service request process, or a handover process of the UE, that the UE moves out of the service area of the first SMF entity.

Optionally, the processor is further configured to: query, using the information relevant to the UE, the NRF entity, and obtain information of the second SMF entity; and determine the second SMF entity according to the information of the second SMF entity.

Optionally, the information of the second SMF entity includes information of a service area of the second SMF entity. The processor is further configured to: store the information of the service area of the second SMF entity, and delete the information of the service area of the first SMF entity.

In a fourth aspect, the present disclosure further provides an AMF entity. The AMF entity includes a processor, a storage and a computer program stored on the storage and executable by the processor, wherein, in a case that the computer program is executed by the processor, the processor implements steps of the method of inserting an SMF according to the first aspect.

In a fifth aspect, the present disclosure further provides a non-volatile computer readable storage medium. The medium includes a computer program stored on the non-volatile computer readable storage medium, wherein in a case that the computer program is executed by a computer processor, the computer processor implements steps of the method according to the first aspect.

The method of inserting an SMF and an AMP entity in some embodiment of the present disclosure queries, by using information relevant to a UE, a second SMF entity capable of serving the UE in a case that the UE moves out of service area of a first SMF entity currently serving a first PDU session of the UE, or in a cases that selecting a SMF entity for the UE is needed; and updates the first PDU session of the UE by using the second SMF entity, so that querying of a SMF entity may be avoided every time position of the UE is updated, and the AMF entity is prevented from frequently selecting a SMF entity, and a service area of the AMF entity and a service area of the SMF entity are not required to be consistent, thereby achieving an efficient insertion of the SMF entity.

BRIEF DESCRIPTION OF THE DRAWINGS

In order to illustrate technical solutions of some embodiments of the present disclosure more clearly, the drawings to be used in some embodiments of the present disclosure will be briefly introduced below. Obviously, the drawings in the following description are only related to some of the embodiments of the present disclosure, and those skilled in the art may obtain other drawings according to the drawings without paying any inventive effort.

DETAILED DESCRIPTION

The technical solutions of some embodiments of the present disclosure will be clearly and completely described below in combination with the drawings in some embodiments of the present disclosure. It is apparent that the described embodiments are only a part, rather than all, of embodiments of the present disclosure. Based on the embodiments of the present disclosure, all other embodiments obtained by those of ordinary skills in the art without paying any creative work are within the protection scope of the present disclosure.

Figure 1:
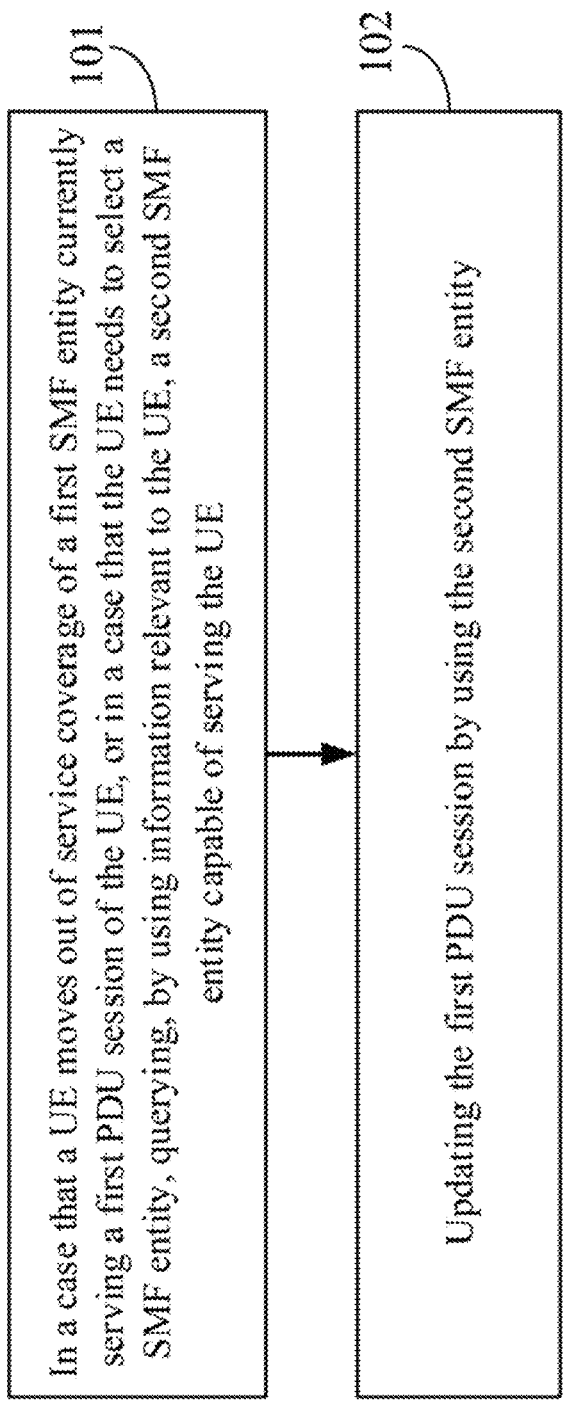
FIG. 1 is a flow chart illustrating a method of inserting an SMF of the present disclosure.

Referring to FIG. 1, some embodiments of the present disclosure provide a method of inserting a Session Management Function (SMF), and the method is applied to an Access and Mobility Management Function (AMF) entity and includes following steps 101-102.

Step 101: in a case that a User Equipment (UE) moves out of service area of a first SMF entity currently serving a first Packet Data Unit (PDU) session of the UE, or in a case that selecting a SMF entity for the UE is needed, querying, by using information relevant to the UE, a second SMF entity capable of serving the UE.

The first SMF entity is a SMF entity currently serving a PDU session of the UE, and at least includes an anchor SMF entity, or may also include an intermediate SMF entity, such as a first intermediate SMF entity. The second SMF entity is a newly queried SMF entity capable of serving the UE, such as a second intermediate SMF entity. The intermediate SMF entity may also be referred to as a local SMF entity.

In some embodiments of the present disclosure, a process of executing the step 101 by the AMF entity may specifically include: determining that the UE moves out of the service area of the first SMF entity, or determining that selecting a SMF entity for the UE is needed according to information provided by the first SMF entity; and querying, using the information relevant to the UE, the second SMF entity capable of serving the UE.

Moreover, querying, by the AMF entity using the information relevant to the UE, the second SMF entity capable of serving the UE may specifically include: querying a NRF entity and obtaining information of the second SMF entity, by using the information relevant to the UE; and determining the second SMF entity according to the information of the second SMF entity.

The information relevant to the UE is, for example, location information of the UE, digital data network (DNN) information, and the like.

Step 102: updating the first PDU session by using the second SMF entity.

The second SMF entity may specifically be a newly queried intermediate SMF entity capable of serving the UE. In a case that the AMF entity updates the PDU session by using the intermediate SMF entity, the AMF entity may send a session management request message to the intermediate SMF entity, so that the intermediate SMF entity selects an intermediate User Plane Function (UPF) entity according to the location information of the UE, and allocates a downlink tunnel for the PDU session for the intermediate UPF entity or requests the intermediate. User Plane Function (UPF) entity to allocate a downlink tunnel for the PDU session, and sends a PDU update request message to an anchor SMF entity. The PDU update request message sent by the intermediate SMF entity carries at least information of the downlink tunnel for the allocated PDU session. After the anchor SMF entity receives the PDU update request message, the anchor SMF entity may configure an anchor UPF entity according to the information of the downlink tunnel therein, and return uplink tunnel information to the intermediate SMF entity, so that the intermediate SMF entity completes tunnel configuration and inserts the PDU session.

In this way, a signaling message between the AMF entity and the intermediate SMF entity may not be relayed by the anchor SMF entity, thereby avoiding transmission of a redundant signaling and a redundant transmission path, and improving a signaling processing efficiency.

The method of inserting an SMF in some embodiments of the present disclosure queries, by using information relevant to the UE, a second SMF entity capable of serving the UE in a case that the UE moves out of service area of a lint SMF entity currently serving a first Packet Data Unit (PDU) session of the UE, or in a case that selecting a SMF entity for the UE is needed; and updates the first PDU session of the UE by using the second SMF entity, so that querying of a SMF entity may be avoided every time position of the UE is updated, and the AMP entity is prevented from frequently selecting a SMF entity, and a service area of the AMP entity and a service area of the SMF entity are not required to be consistent, thereby achieving an efficient insertion of the SMF entity.

In some embodiments of the present disclosure, the AMP entity may determine, according to the information provided by the first SMF entity, that the UE moves out of the service area of the first SMF entity or selecting a SMF entity for the UE is needed; the AMF entity may also determine, according to information of the service area of the first SMF entity provided by a NF Repository Function (NRF) entity, that the UE moves out of the service area of the first SMF entity. Specifically, the step 101 may include: determining, according to the information of the service area of the first SMF entity provided by the NRF, that the UE moves out of the service area of the first SMF entity; and querying, by using the information relevant to the UE, the second SMF entity capable of serving the UE.

Determining, according to the information of the service area of the first SMF entity provided by the NRF, that the UE moves out of the service area of the first SMF entity includes: obtaining and storing the information of the service area of the first SMF entity provided by, the NRF entity, and determining, according to the information of the service area of the first SMF entity during a registration update process, a service request process, or a handover process of the UE, that the UE moves out of the service area of the first SMF entity.

Further, querying, by using the information relevant to the UE, the second SMF entity capable of serving the UE includes: querying the NRF entity by using the information relevant to the UE, and obtaining information of the second SMF entity; and determining the second SMF entity according to the information of the second SMF entity.

Further, the information of the second SMF entity may include information of service area of the second SMF entity in order to facilitate subsequent updating of the PDU session, the AMF entity may store the information of the service area of the second SMF entity, and delete the information of the service area of the first SMF entity.

In some embodiments of the present disclosure, in order to avoid frequently selecting a SMF entity, in a case that the AMF entity selects the SMF entity, optionally, the SMF entity may be selected during the registration update process of the UE or in a case that a handover request or a path switch request message sent by a base station serving the UE is received. Therefore, prior to the step 101, the method of inserting an AMF in some embodiments of the present disclosure may also include: receiving a registration request message sent by the UE, or receiving a handover request or a path switch request message sent by a base station serving the UE; and determining information of the first PDU session of the UE, the information of the first PDU session including an identifier ID of the first SMF entity and the information of the first PDU session being information related to the first PDU session.

Further, in order to enable the first SMF entity to judge whether the UE moves out of service area of the first SMF entity or whether selecting a SMF entity for the UE is needed, the AMF entity may also provide location information of the UE to the first SMF entity. Therefore, the method of inserting an SMF in some embodiments of the present disclosure may further provide the location information of the UE to the first SMF entity.

In some embodiments of the present disclosure, at least following three ways in which the AMF entity, according to the information provided by the first SMF entity, determines that the UE moves out of the service area of the first SMF entity, or determines that selecting a SMF entity for the UE is needed, may be provided.

A first way: according to the indication information provided by an anchor SMF entity, the AMF entity determines that the UE moves out of the service area of the anchor SMF entity or determines that selecting a SMF entity for the UE is needed. Indication information provided by the anchor SMF entity is determined by the anchor SMF entity according to the location information of the UE provided by the AMF entity and information of the service area of the anchor SMF entity.

A second way: the AMF entity determines, according to indication information provided by the first intermediate SMF entity, that the UE moves out of the service area of the first intermediate SMF entity, or determines, according to indication information provided by the first intermediate SMF entity, that selecting a SMF entity for the UE is needed. The indication information provided by the first intermediate SMF entity is determined by the first intermediate SMF entity according to the location information of the UE provided by the AMF entity and the information of the service area of the first intermediate SMF entity.

A third way: the AMF entity determines, according to the information of the service area of the first intermediate SMF entity provided by the first intermediate SMF entity and the location information of the UE, that the UE moves out of the service area of the first intermediate SMF entity, or determines, according to information of the service area of the first intermediate SMF entity provided by the first intermediate SMF entity and the location information of the UE that selecting a SMF entity for the UE is needed.

In some embodiments of the present disclosure, in a case that the AMF entity updates the PDU session of the UE, an intermediate SMF entity existing in a network and serving the UE may be reused, in addition to reselecting a new intermediate SMF entity according to the information provided by the first SMF entity. Specifically, in a case that the AMF entity receives the registration request message sent by the UE, or receives the handover request or the path switch request message sent by the base station serving the UE, the method of inserting an SMF in some embodiments of the present disclosure further includes: determining that the second SMF entity is serving the UE in network; and judging whether the second SMF entity is still able to serve the UE; if the second SMF entity is still able to serve the UE, inserting the second SMF entity into the first PDU session if an anchor SMF entity of the first PDU session differs from the second SMF entity; if the second SMF entity is unable to continue providing the service, querying a third SMF entity capable of serving the UE, and inserting: the third SMF entity into the first PDU session.

In addition, information of the first PDU session of the UE determined by the AMF entity may further include: information of a network slice to which the first PDU session belongs. In a case that the information of the first PDU session includes the information of the network slice to which the first PDU session belongs, and in a case that the AMF entity timber receives the registration request message with by the UE, or receives the handover request or the path switch request message sent by the base station serving the UE, the method of inserting an SMF in some embodiments of the present disclosure further includes: determining, according to the information of the network slice to which the first PDU session belongs, that the second SMF entity is serving, the UE in the network slice to which the first PDU session belongs; judging whether the second SMF entity is able to continue providing service; in a case that the second SMF entity is able to continue providing service, and if an anchor SMF entity of the first PDU session differs from the second SMF entity, inserting the second SMF entity into the first PDU session; in a ease that the second SNIP entity is unable to continue providing service, querying a fourth SMF entity capable of serving the UE, and inserting the fourth SMF entity into the first PDU session.

In some embodiments of the present disclosure, in order to avoid frequently inserting the intermediate SMF entity and avoid wasting a network resource, the AMF entities may also reuse SMF entities of different PDU sessions of the same UP. Specifically, after the step 102, the method of inserting an SMF in some embodiments of the present disclosure further includes: determining that the second SMF entity is serving the UE in the network; and in a case that the UE moves out of service area of a fifth SMF entity of a second PDU session currently serving the UE, or in a case that selecting a SMF entity for the UE is needed, inserting the second SMF entity into the second PDU session.

In addition, in a case that the network supports a slice, after the step 102, the method of inserting an SMF in some embodiments of the present disclosure may further include: determining information of a network slice to which the first PDU session belongs; according to the information of the network slice to which the first PDU session belongs, determining that a second PDU session of the UE exists in the network slice to which the first PDU session belongs; determining that the second SMF entity is serving the UE in the network slice to which the first PDU session belongs, and in a case that the UE moves out of service area of a sixth SMF entity currently serving the second PDU session, or in a case that selecting a SMF entity for the UE is needed, inserting the second SMF crafty into the second PDU session.

In general, if insertion of the intermediate SMF is completed during the registration update process of the UE, then in a case that the UE initiates a service request within a current registration area, the network does not need to check whether the intermediate SMF needs to be inserted for the PDU session of the UE. However, in a specific implementation, due to uncertainty of a network deployment, it is not excluded that the network also checks, during the service request process of the UE, whether the intermediate SMF needs to be inserted for the mu session of the UE. In some embodiments of the present disclosure, a process of inserting the intermediate SMF during the service request process of the UE is basically the same as the process of inserting the intermediate SMF during the registration update process of the UE. Difference therebetween is that trigger conditions thereof are different, and thus the description is not repeated.

Next, a specific example of the process of inserting a SMF entity of the present disclosure will be described with reference to FIG. 2 to FIG. 9, respectively.

Figure 2:
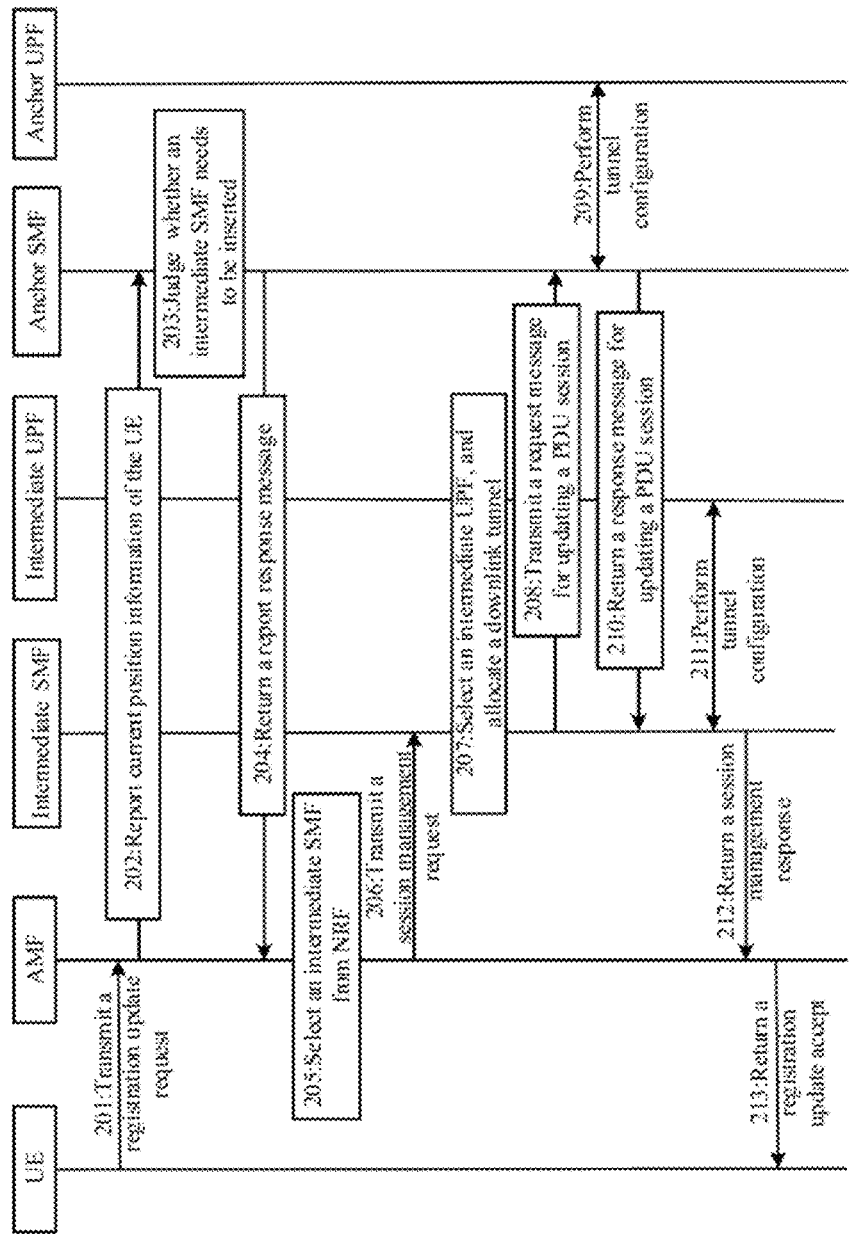
FIG. 2 is a flow chart illustrating a process of inserting a SMF entity of the present: disclosure.

Referring to FIG. 2, FIG. 2 is a flow chart illustrating a process of inserting a SMF entity of the present disclosure. In this figure, an anchor SMF entity determines that the intermediate SMF entity needs to be selected and indicates the AMF entity, and the process of inserting the SMF entity is triggered by the UE. During a PDU session establishment process, the anchor SMF entity subscribes location information of the UE to the AMF entity. The process of inserting a SMF entity shown in FIG. 2 includes the following steps 201-213.

Step 201: in a case that a UE moves out of a currently allocated registration area, transmitting, by the UE, a registration request message to an AMF entity through a new Radio Access Network (RAN) base station.

Step 202: reporting, by the AMF entity, current location information of the UE of the UE to an anchor SMF entity of each PDU session according to information of a PDU session established by the UE; wherein, the current location information of the UE may be information of a Tracking Area Identity (TAI) of a tracking area where the UE is currently located or may be information of a TAI list allocated by the AMF entity according to the TAI of the track area where the UE is currently located.

Step 203: determining, by the anchor SMF entity according to location information of the UE and information of service area of the anchor SMF entity, whether an intermediate SMF entity needs to be inserted in the PDU session, wherein if a current position of the UE is not within the service area of the anchor SMF entity, the anchor SMF entity determines that the intermediate SMF entity needs to be inserted for the PDU session, otherwise determines that the intermediate SMF entity does not need to be inserted for the PDU session.

Step 204: returning, by the anchor SMF entity, a report response message to the AMF entity in a case that it is determined that the intermediate SMF entity needs to be inserted for the PDU session, wherein the report response message carries indication information indicating that the intermediate SMF entity needs to be selected.

Step 205: after the AMF entity receives the indication information, selecting, by the AMF entity, the intermediate SMF entity (a SMF reselection operation) from the NRF entity, and storing an ID of the selected intermediate SMF entity; wherein, in a case that the intermediate SMF entity is selected from the NRF entity, at least the location information of the UE is carried, and DNN information and possible network slice information, such as Network Slice Selection Assistance Information (NSSAI) or a network slice instance identity may also be carried.

Step 206: sending, by the AMF entity, a session management request message to the selected intermediate SMF entity; wherein the session management request message carries at least an ID of the PDU session, location information of the UE, and an ID of the anchor SMF entity.

Step 207: after the intermediate SMF entity receives the session management request message, selecting, by the intermediate SMF entity, an intermediate UPF entity according to the location information of the UE, and allocating, for, the intermediate UPF entity, a downlink tunnel for the PDU session or requesting the intermediate UPF entity to allocate a downlink tunnel for the PDU session.

Step 208: sending, by the intermediate SMF entity, a PDU update request message to the anchor SMF entity; wherein the PDU update request message carries information of the allocated downlink tunnel information for the PDU session.

Step 209: after the anchor SMF entity receives the PDU update request message, configuring, by the anchor SMF entity, an anchor UPF entity (N4 configuration) according to the information of the downlink tunnel therein.

Step 210: returning, by the anchor SMF entity, a PDU update response message to the intermediate SMF; wherein configured uplink tunnel information is carried in the PDU update response message.

Step 211: performing, by the intermediate SMF entity, configuration of an uplink channel.

Step 212: after the intermediate SMF emit completes the configuration of the uplink tunnel, returning, by the intermediate SMF entity, a session management response message to the AMF entity.

Step 213: returning, by the AMF entity, a registration update accept message to the UE through a new RAN base station.

Figure 3:
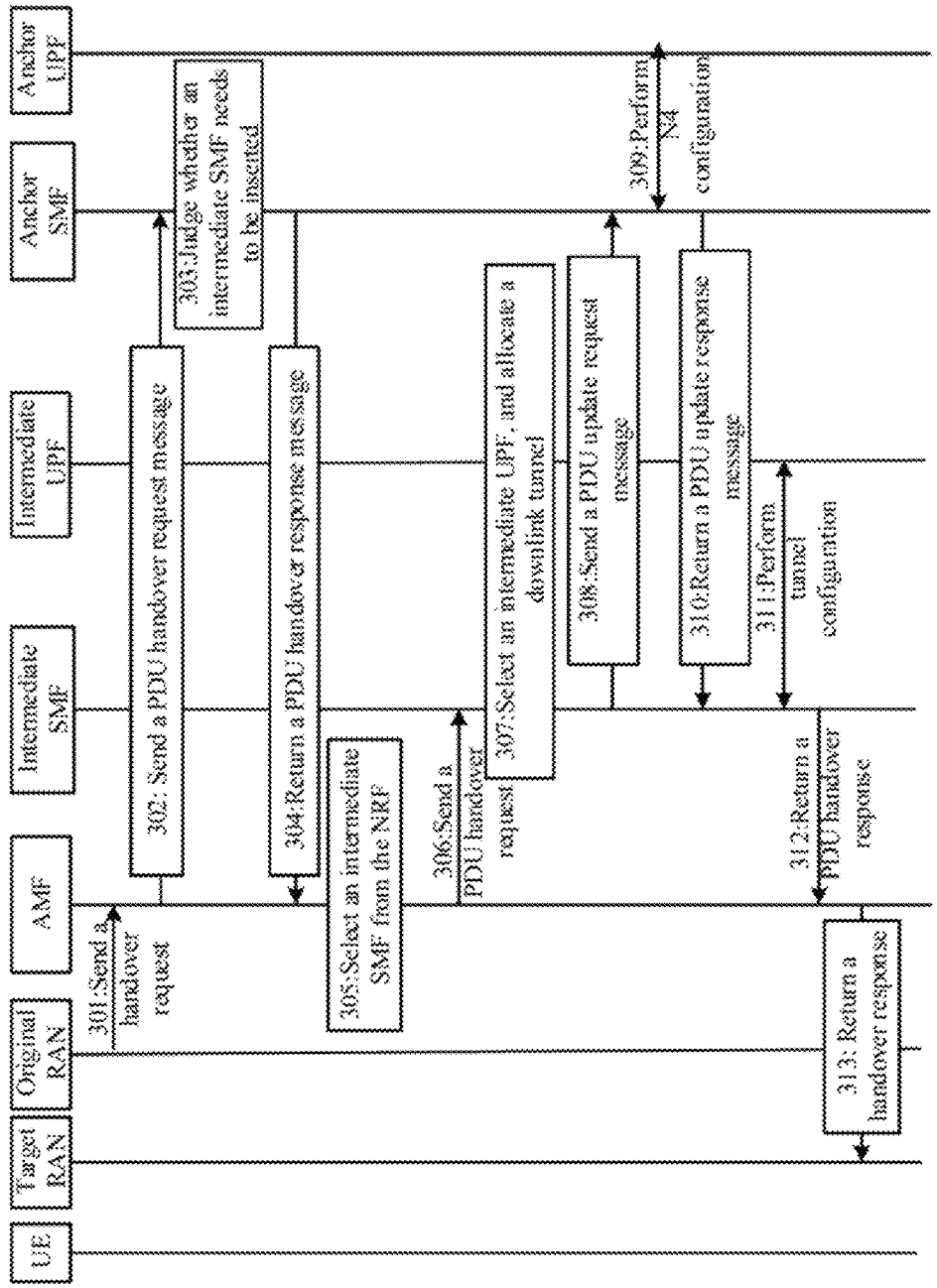
FIG. 3 is a flow chart illustrating a process of inserting a SMF entity of the present disclosure.

Referring to FIG. 3, FIG. 3 is a flow chart illustrating a process of inserting a SMF entity of the present disclosure. In the figure, the anchor SMF entity determines that the intermediate SMF entity needs to be selected and indicates the AMF entity, and inserts an intermediate SMF after a handover request message is received. The process of inserting a SMF entity shown in FIG. 3 includes the following steps 301-313.

Step 301: sending, by an original base station, a handover request message to an AMF entity in a RAN handover process.

Step 302: after the AMF entity receives the handover request message, sending, by the AMF entity, a PDU handover request message to an anchor SMF entity of each PDU session according to PDU session information established by the UE, wherein current location information of the UE is carried in the PDU handover request message, and current location information of the UE may be TAI information of a tracking area where the UE is currently located, or TAI list information allocated by the AMF entity according to the TAI of the track are where the UE is currently located, or a node identifier of a 5G access network (Next Generation Radio Access Network, NG RAN) node currently serving the UE.

Step 303: determining, by the anchor SMF entity according to the location information of the UE and information of service area of the anchor SMF entity, whether an intermediate SMF entity needs to be inserted for the PDU session; wherein if a current position of the UE is not within the service area of the anchor SMF entity, then the anchor SMF entity determines that an intermediate SMF entity needs to be inserted for the PDU session, otherwise determines that the intermediate SMF entity does not need to be inserted for the PDU session.

Step 304: returning, by the anchor SMF entity, a PDU handover response message to the AMF entity in a case that the anchor SMF entity determines that an intermediate SMF entity needs to be inserted for the PDU session; wherein the PDU handover response message carries the indication information indicating that the intermediate SMF entity needs to be selected.

Step 305: after the AMF entity receives the indication information, selecting, by the AMF entity, an intermediate SMF entity (an SMF reselection operation) from the NRF entity, and storing an ID of the selected intermediate SMF entity wherein, in a case that the intermediate SMF entity is selected from the NRF entity, at least the location information of the UE is carried, DNN information and possible network slice information, such as NSSAI or a network slice instance identity, may also be carried.

Step 306: sending, by the AMF entity, a PDU handover request message to the selected intermediate SMF entity; wherein the PDU handover request message carries at least an ID of the PDU session, location information of the UE, and an ID of the anchor SMF entity.

Step 307: after the intermediate SMF entity receives the PDU handover request message, selecting, by the intermediate SMF entity, an intermediate UPF entity according to the location information of the UE, and allocating, for the intermediate UPF entity; a downlink tunnel for the PDU session or requesting the intermediate UPF entity to allocate a downlink tunnel for the PDU session.

Step 308: sending, by the intermediate SMF entity, a PDU update request message to the anchor SMF entity, wherein the PDU update request massaging carries information of the allocated downlink tunnel for the PDU session.

Step 309: after the anchor SMF entity receives the PDU update request message, configuring, by the anchor SMF entity, an anchor UPF entity (that is, performing the N4 configuration) according to the information of the downlink tunnel therein.

Step 310: returning, by the anchor SMF entity, a PDU update response message to the intermediate SMF entity, wherein configured uplink tunnel information is carried in the PDU update response message.

Step 311: performing, by the intermediate SMF entity, uplink tunnel configuration.

Step 312: after the intermediate SMF entity completes configuration of the tunnel, returning, by the intermediate SMF entity, a PDU handover response message to the AMF entity, wherein information of an allocated uplink N3 tunnel is carried in the PDU handover response message.

Step 313: sending, by the AMF entity, a handover response message to a new NG RAN node, wherein the information of the uplink N3 tunnel is carried in the handover response message.

Figure 4:
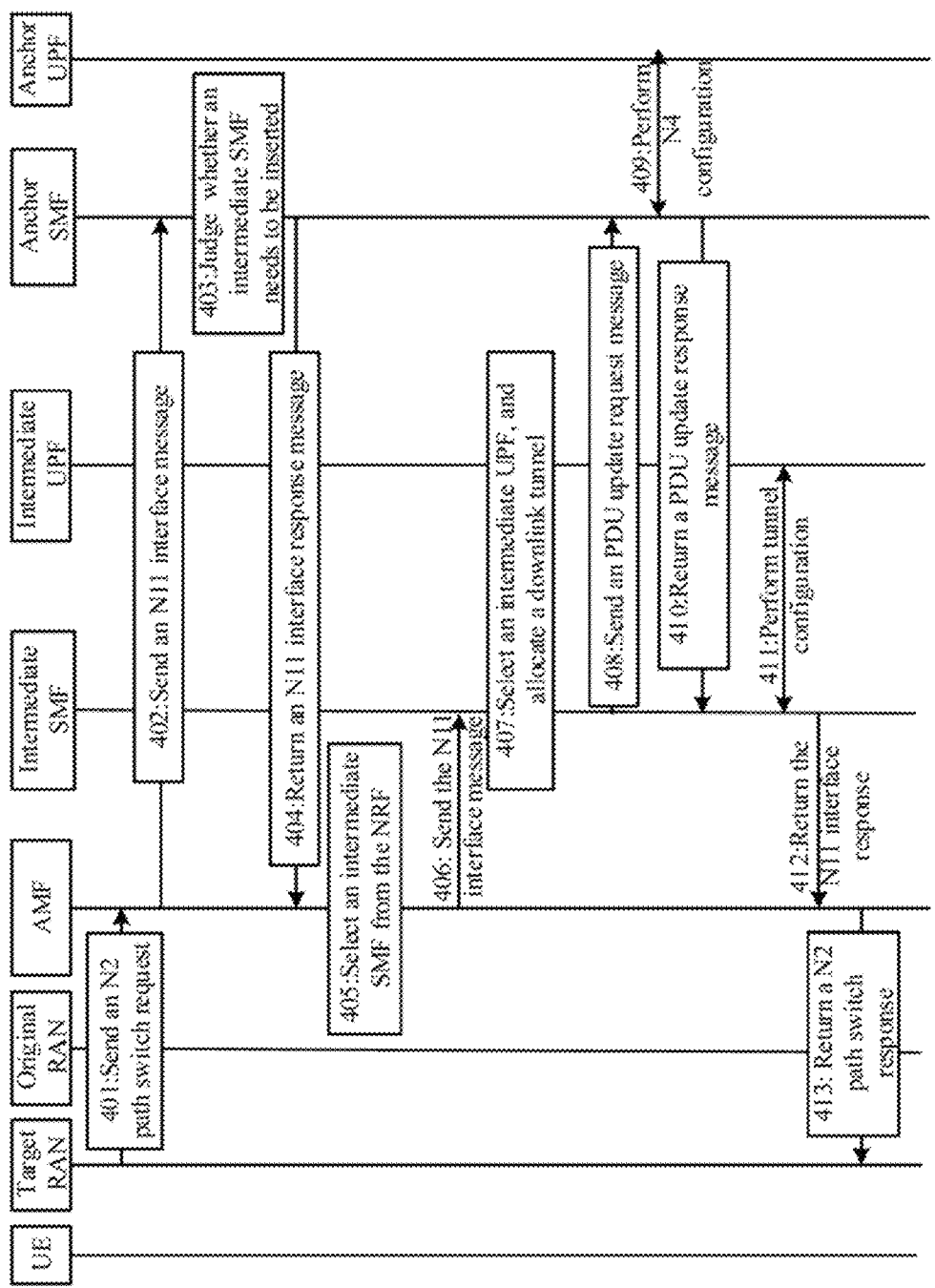
FIG. 4 is a flow chart illustrating a process of inserting a SMF entity of the present disclosure.

Referring to FIG. 4, FIG. 4 is a flow chart illustrating a process of inserting a SMF entity of the present disclosure. In this figure, an original NG RAN and a target NG RAN perform a handover based on an Xn interface, and the anchor SMF entity determines that the intermediate SMF entity needs to be selected, indicates the AMF entity, and inserts an intermediate SMF after a N2 path switch request message is received. The process of inserting the SMF entity shown in FIG. 4 includes following steps 401-413.

Step 401: in a handover process based on the Xn interface, transmitting, by a target base station, a N2 path switch request message to an AMF entity.

Step 402: after the AMF entity receives the N2 path switch request message, transmitting, by the AMF entity, an N11 interface message to an anchor SMF entity of each PDU session according to PDU session information established by the UE, wherein current location information of the UE may be carried, and the current location information of the UE may be TAI information of a tracking area where the UE is currently located, or TAI list information allocated by the AMF entity according to the TAI of the track area where the UE is currently located, or a node identifier of a NG RAN node currently serving the UE.

Step 403: determining, by the anchor SMF entity according to the location information of the UE and information of service area of the anchor SMF entity, whether an intermediate SMF entity needs to be inserted for the PDU session; wherein if the current position of the UE is not within the service area of the anchor SMF entity, the anchor SMF entity determines that an intermediate SMF entity needs to be inserted for the PDU session, otherwise determines that the intermediate SMF entity does not need to be inserted for the PDU session.

Step 404: returning, by the anchor SMF entity, an N11 interface response message to the AMF entity in a case that the anchor SMF entity determines that an intermediate SMF entity needs to be inserted for the PDU session; wherein the response message carries the indication information indicating that the intermediate SMF entity needs to be selected.

Step 405: after the AMF entity receives the indication information, selecting, by the AMF entity, an intermediate SMF entity (a SMF reselection operation) from the NRF entity, and storing an ID of the selected intermediate SMF entity; wherein, in a case that the intermediate SMF entity is selected from the NRF entity, at least the location information of the UE is carried, DNN information and possible network slice information, such as NSSAI or a network slice instance identity may also be carried.

Step 406: sending, by the AMF entity, the N11 interface message to the selected intermediate SMF entity; wherein the N11 interface message carries at least an ID of the PDU session, location information of the UE, and an ID of the anchor SMF entity.

Step 407: alter the intermediate SMF entity receives the N11 interface message, selecting, by the intermediate SMF entity, an intermediate UPF entity according to the location information of the UE, and allocating, for die intermediate UPF entity, a downlink tunnel for the PDU session or requesting the intermediate UPF entity to allocate a downlink tunnel for the PDU session.

Step 408: sending, by the intermediate SMF entity, a PDU update request message to the anchor SMF entity, wherein the PDU update request message carries information of the allocated downlink tunnel for the PDU session.

Step 409: after the anchor SMF entity receives the PDU update request message, configuring, by the anchor SMF entity, an anchor UPF entity (that is, performing the N4 configuration) according to information of the downlink tunnel therein.

Step 410: returning, by the anchor SMF entity, a PDU update response message to the intermediate SMF entity; wherein configured uplink tunnel information is carried in the PDU update response message.

Step 411: performing, by the intermediate SMF entity, configuration of an uplink tunnel.

Step 412: after the intermediate SMF entity completes configuration of the tunnel, returning, by the intermediate SMF entity, the N11 interface response message to the AMF entity; wherein the information of the allocated uplink N3 tunnel is carried in the N11 interface response message.

Step 413: sending, by the AMF entity, a N2 path switch response message to a new NG RAN node; wherein the uplink N3 tunnel information is carried in the N2 path switch response message.

In the above FIG. 2 to FIG. 4, the anchor SMF entity determines that the intermediate SMF entity needs to be selected, but in addition to this, the original intermediate SMF entity may also determine that an intermediate SMF entity needs to be re selected, for example, in FIG. 5 to FIG. 7 below.

Figure 5:
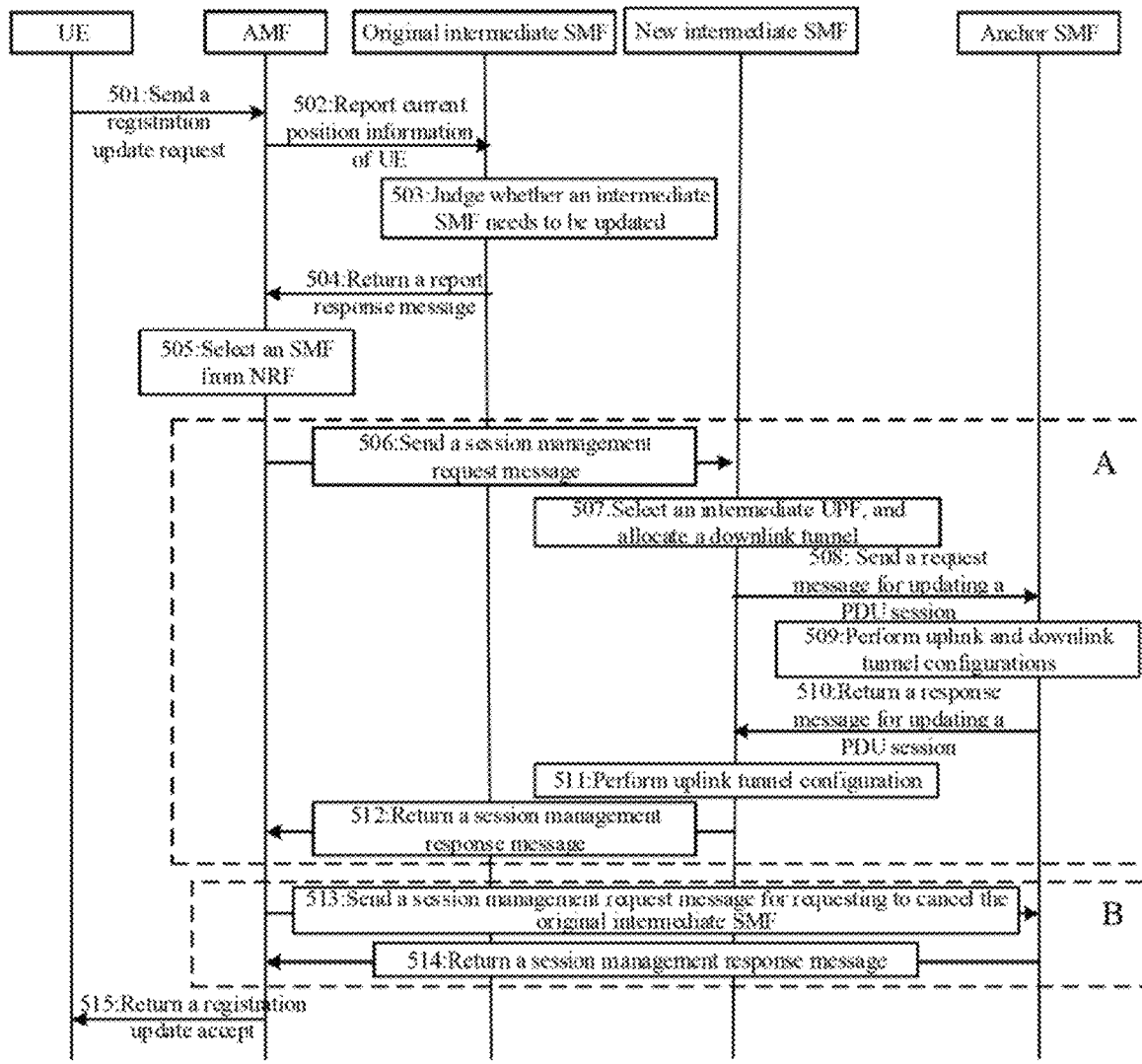
FIG. 5 is a flow chart illustrating a process of inserting a SMF entity of the present disclosure.

Referring to FIG. 5, FIG. 5 is a flow chart illustrating a process of inserting a SMF entity of the present disclosure. In this figure, the original intermediate SMF entity determines that a new intermediate SMF entity needs to be selected, and indicates the AMF entity, and the process of inserting the SMF entity is triggered by the UE. The process of inserting a SMF entity shown in FIG. 5 includes following steps 501-515.

Step 501: transmitting, by the UE, a registration request message to the AMF entity in a case that the UE moving outs of a currently allocated registration area.

Step 502: reporting, by the AMF entity, current location information of the UE to an intermediate SMF entity, i.e., the original intermediate SMF entity, of a PDU session; wherein the AMF entity stores an ID of the original intermediate SMF entity of the PDU session and an ID of the anchor SMF entity, and the current location information of the UE may be TAI information of a tracking area where the UE is currently located, or TAI list information allocated by the AMF entity according to the TAI of the track area where the UE is currently located.

Step 503: determining, by the original intermediate SMF entity according to the location information of the UE and information of service area of the original intermediate SMF entity, whether updating of the intermediate SMF entity is needed; wherein if a current position of the UE is not within the service area of the original intermediate SMF entity, the original intermediate SMF entity determines that reselection of an intermediate SMF entity for the PDU session is needed, otherwise determines that the reselection of an intermediate SMF entity for the PDU session is not needed.

Step 504: returning, by the original intermediate SMF entity, a report response message to the AMF entity in a case that the original intermediate SMF entity determines that reselection of the intermediate SMF entity for the PDU session is needed; wherein the report response message carries the indication information indicating that reselection of the intermediate SMF entity is needed.

Step 505: after the AMF entity receives the indication information, selecting, by the AMF entity, a SMF entity (a SMF reselection operation) from the NRF entity, and storing the ID of the selected SMF entity; wherein, in a case that the SMF entity is selected from the NRF entity, at least the location information of the UE is carried, DNN information and possible network slice information, such as NSSAI or a network slice instance identity, may also be carried.

If the ID of the SMF entity returned by the NRF entity is not the ID of the anchor SMF entity, but an ID of a new intermediate SMF entity, the AMF entity determines that updating of the intermediate SMF entity is needed for the PDU session, and steps 306 to 312 are performed.

Step 506: sending, by the AMF entity, a session management request message to the new intermediate SMF entity; wherein the session management request message carries at least the ID of the PDU session, the location information of the UE, and the ID of the anchor SMF entity.

Step 507: after the new intermediate SMF entity receives the session management request message, selecting, by the new intermediate SMF entity, an intermediate UPF entity according to the location information of the UE, and allocating, for the intermediate UPF entity, a downlink tunnel for the PDU session or requesting the intermediate UPF entity to allocate a downlink tunnel for the PDU session.

Step 508: sending, by the new intermediate SMF entity, a PDU update request message to the anchor SMF entity; wherein the PDU update request message may carry information of the allocated downlink tunnel for the PDU session.

Step 509: after the anchor SMF entity receives the PDU update request message, performing, by the anchor SMF entity, uplink and downlink tunnel configurations and configuring an anchor UPF entity according to information of the downlink tunnel therein.

Step 510: returning, by the anchor SMF entity, a PDU update response message to the new intermediate SMF entity; wherein the configured uplink tunnel information is carried in the PDU update response message.

Step 511: performing, by the new intermediate SMF entity; the uplink tunnel configuration.

Step 512: after the new intermediate SMF entity completes the tunnel configuration, returning, by the new intermediate SMF entity, a session management response message to the AMF entity, and after the AMF entity receives the session management response message, requesting, by the AMF entity, the original intermediate SMF entity to delete a control plane connection and a user plane connection of the PDU session.

If the ID of the SMF entity returned by the NRF entity is the ID of the anchor SMF entity, then the AMF entity determines that inserting of the intermediate SMF entity for the PDU session is not needed, and the steps 313 to 314 are performed.

Step 513: sending, by the AMF entity, a session management request message to the anchor SMF entity for requesting to cancel the original intermediate SMF entity; wherein the session management request message may carry the indication information indicating cancellation of the original intermediate SMF entity is requested.

Step 514: after the anchor SMF entity receives the indication information, deleting, by the anchor SMF entity, a tunnel between the anchor SMF entity and the intermediate UPF entity and returning a session management response message to the AMF entity; after the AMF entity receives the session management response message, the AMF entity may request the original intermediate SMF entity to delete a control plane connection and a user plane connection of the PDU session.

Step 515: returning, by the AMF entity, a registration update accept message to the UE.

Figure 6:
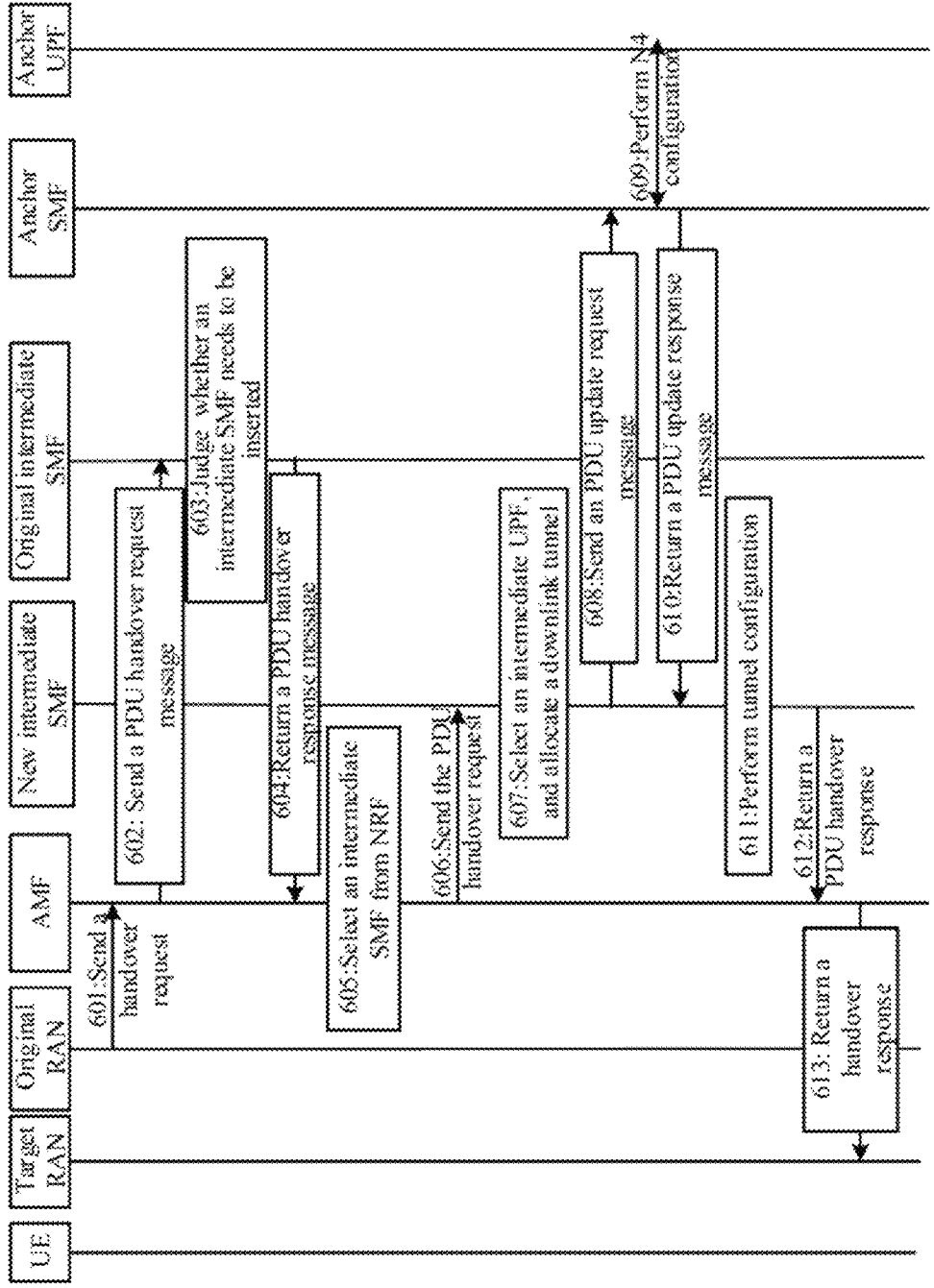
FIG. 6 is a flow chart illustrating a process of inserting a SMF entity of the present disclosure.

Referring to FIG. 6, FIG. 6 is a flow chart illustrating a process of inserting a SMF entity of the present disclosure. In this figure, the original intermediate SMF entity determines that a new intermediate SMF entity needs to be selected, indicates the AMF entity, and reselects an intermediate SMF after the original intermediate SMF entity receives a handover request message. The process of inserting a SMF entity shown in FIG. 6 includes the following steps 601-613.

Step 601: sending, by an original base station, a handover request message to an AMF entity in a RAN handover process.

Step 602: after the AMF entity receives the handover request message, transmitting, by the AMF entity, a PDU handover request message to the original intermediate SMF entity SMF entity of each PDU session according to PDU session information established by the UE, wherein current location information of the UE is carried in the PDU handover request message, and the current location information of the UE may be TAI information of a tracking area where the UE is currently located, or TAI list information allocated by the AMF entity according to a TAI of the track area where the UE is currently located, or a node identifier of a NG RAN node currently serving the UE.

Step 603: determining, by the original intermediate SMF entity according to the location information of the UE and information of a service area of the original intermediate SMF entity, whether an intermediate SMF entity needs to be inserted for the PDU session or not; wherein if a current position of the UE is not within the service area of the original intermediate SMF entity, then the original intermediate SMF entity determines that an intermediate SMF entity needs to be inserted for the PDU session, otherwise determines that the intermediate SMF entity does not need to be inserted for the PDU session.

Step 604: returning, by the original intermediate SMF entity, a PDU handover response message to the AMF entity in a case that the original intermediate SMF entity determines that an intermediate SMF entity needs to be inserted for the PDU session; wherein the PDU handover response message carries the indication information indicating that an intermediate SMF entity needs to be selected.

Step 605: after the AMF entity receives the indication information, selecting, by the AMF entity, a new intermediate SMF entity (a SMF reselection operation) from the NRF entity, and stores an ID of the selected new intermediate SMF entity; wherein, in a case that the intermediate SMF entity is selected from the NRF entity, at least the location information of the UE is carried, DNN information and possible network slice information, such as NSSAI or a network slice instance identity, may also be carried.

Step 606: sending, by the AMF entity, the PDU handover request message to the selected new intermediate SMF entity; wherein the PDU handover request message carries at least an ID of the PDU session, location information of the UE, and an ID of an anchor SMF entity.

Step 607: after the new intermediate SMF entity receives the PDU handover request message, selecting, by the new intermediate SMF entity, an intermediate UPF entity according to the location information of the UE, and allocating, for the intermediate UPF entity, a downlink tunnel for the PDU session or requesting the intermediate UPF entity to allocate a downlink tunnel for the PDU session.

Step 608: sending, by the new intermediate SMF entity, a PDU update request, message to the anchor SMF entity; wherein the PDU update request message may carry information of the allocated downlink tunnel for the PDU session.

Step 609: after the anchor SMF entity receives the PDU update request message, configuring, by the anchor SMF entity, an anchor UPF entity (that is, performing N4 configuration) according to information of the downlink tunnel therein.

Step 610: returning, by the anchor SMF entity, a PDU update response message to the new intermediate SMF, wherein configured uplink tunnel information is carried in the PDU update response message.

Step 611: performing, by the new intermediate SMF entity, uplink tunnel configuration.

Step 612: after the new SMF entity completes the tunnel configuration, returning, by the new intermediate SMF entity, a PDU handover response message to the AMF entity; wherein the allocated uplink N3 tunnel information is carried in the PDU handover response message.

Step 613: sending, by the AMF entity, a handover response message to a new NG RAN node, wherein the uplink N3 tunnel information is carried in the handover response message.

Figure 7:
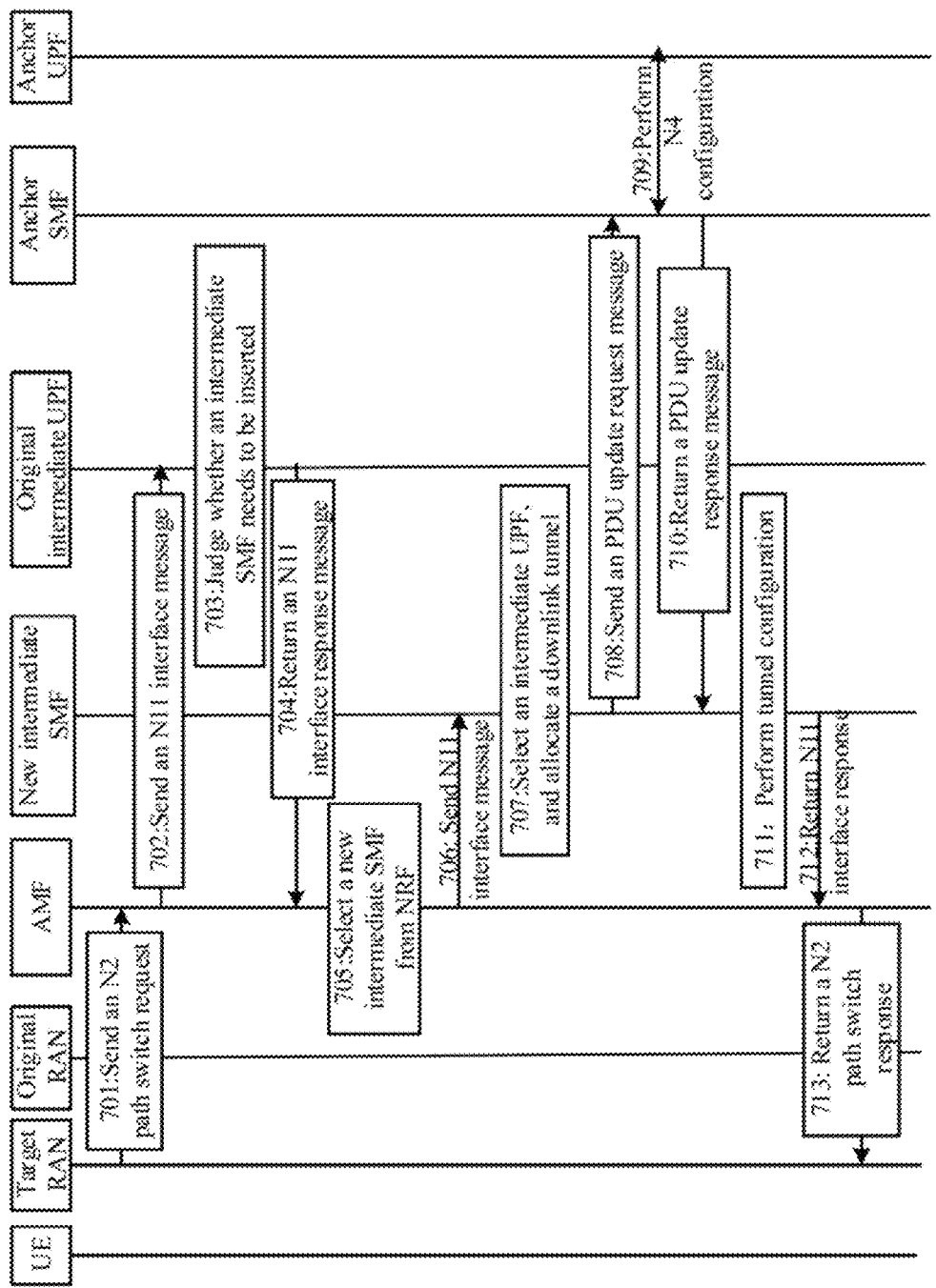
FIG. 7 is a flow chart illustrating a process of inserting a SMF entity of the present disclosure.

Referring to FIG. 7, FIG. 7 is a flow chart illustrating a process of inserting a SMF entity of the present disclosure. In this figure, an original NG RAN and a target NG RAN perform a handover procedure based on an Xn interface, and an original intermediate SMF entity determines that a new intermediate SMF entity needs to be selected, indicates the AMF entity, and reselects an intermediate SMF entity after a N2 path switch request message is received. The process of inserting a SMF entity shown in FIG. 7 includes following steps 701-713.

Step 701: in a handover process based on the Xn interface, transmitting, by a target base station, a N2 path switch request message to an AMF entity.

Step 702: After the AMF entity receives the N2 path switch request message, sending, by the AMF entity, an N11 interface message to the original intermediate SMF entity of each PDU session according to the PDU session information established by the UE, wherein current location information of the U may be carried, and the current location information of the UE may be TAI information of a tracking area where the UE is currently located, or TAI list information allocated by the AMF entity according to the TAI of the track area when the UE is currently located, or a node identifier of a NG RAN node currently serving the UE.

Step 703: determining, by the original intermediate SMF entity according to the location information of the UE and information of a service area of the original intermediate SMF entity, whether an intermediate SMF entity needs to be inserted for the PDU session or not; wherein if a current position of the UE is not within the service area of the anchor SMF entity, then the anchor SMF entity determines that an intermediate SMF entity needs to be inserted for the PDU session, otherwise determines that an intermediate SMF entity does not need to be inserted for the PDU session.

Step 704: returning, by the original intermediate SMF entity, an N11 interlace response message to the AMF entity in a case that the original intermediate SMF entity determines that an intermediate SMF entity needs to be inserted for the PDU session; wherein the response message carries the indication information indicating that the intermediate SMF entity needs to be selected.

Step 705: after the AMF entity receives the indication information, selecting, by the AMF entity, a new intermediate SMF entity (a SMF reselection operation) from the NRF entity, and storing an ID of the selected new intermediate SMF entity; wherein, in a case that the intermediate SMF entity is selected from the NRF entity, at least the location information of the UE is carried, DNN information and possible network slice information, such as NSSAI or a network slice instance identity, may also be carried.

Step 706: sending, by the AMF entity, a N11 interface message to the selected new intermediate SMF entity; wherein the N11 interface message carries at least an ID of the PDU session, the location illumination of the UE, and an ID of the anchor SMF entity.

Step 707: after the new SMF entity receives the N11 interface message, selecting, by the new intermediate SMF entity, an intermediate UPF entity according to the location information of the UE, and allocating, for the intermediate UPF entity, a downlink tunnel for the PDU session or requesting the intermediate UPF entity to allocate a downlink tunnel for the PDU session.

Step 708: sending, by the new intermediate SMF entity, a PDU update request message to the anchor SMF entity, wherein the PDU update request message may carry information of the allocated downlink tunnel for the PDU session.

Step 709; after the anchor SMF entity receives the PDU update request message, configuring, by the anchor SMF entity, an anchor UPF entity (i.e., performing the N4 configuration) according to information of the downlink tunnel therein.

Step 710: returning, by the anchor SMF entity, a PDU update response message to the new intermediate SMF, wherein configured uplink tunnel information is carried in the PDU update response message.

Step 711: performing, by the intermediate SMF entity, uplink tunnel configuration.

Step 712: alter the new intermediate SMF entity completes the tunnel configuration, returning, by the new intermediate SMF entity, a N11 interface response message to the AMF entity; wherein the allocated uplink N3 tunnel information is carried in the N11 interface response message.

Step 713: sending, by the AMF entity, a N2 path switch response message to a new NG RAN node: wherein the uplink N3 tunnel information is carried in the N2 path switch response message.

Figure 8:
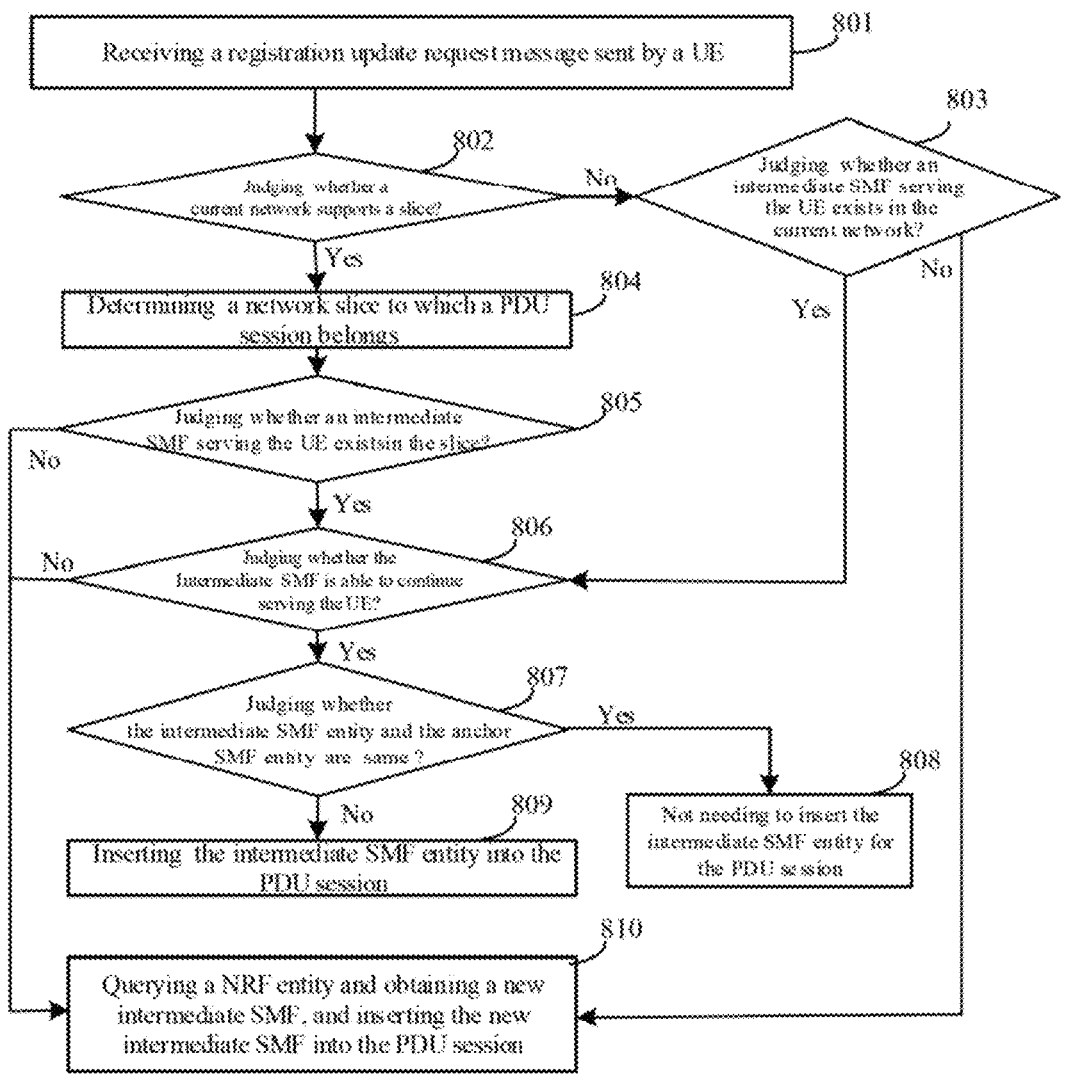
FIG. 8 is a flow chart illustrating a process of inserting a SMF entity of the present disclosure.

The above FIG. 2 to FIG. 7 illustrate that an intermediate SMF entity is reselected for the PDU session, but in addition to this, the selected intermediate SMF entity may also be reused, for example, FIG. 8.

Referring to FIG. 8, FIG. 8 is a flow chart illustrating a process of inserting a SMF entity of the present disclosure. In this figure, a selected intermediate SMF entity may be reused, and a network slice to which each PDU session belongs is determined according to Single Network Slice Selection Assistance Information (S-NSSAI) or a Network Slice Instance ID (NSI ID) corresponding to a PDU session ID stored in a UE context. The process of inserting a SMF entity shown in FIG. 8 includes following steps 801-810.

Step 801: receiving, by an AMF entity, a registration request message sent by a UE in a case that the UE moves out of a currently allocated registration area.

Step 802: determining, by the AMF entity, whether a current network supports a slice.

Step 803: if the current network does not support the slice, determining, by the AMF entity, whether an intermediate SMF serving the UE exists in the current network; if the intermediate SMF serving the UE exists, performing a step 806; otherwise, performing a step S10.

Step 804: if the current network supports the slice, determining, by the AMF entity, information of a network slice to which a PDU session of the UE belongs, and determining, according to the information of the network slice, the network slice to which the PDU session belongs; wherein the information of the network slice may be specifically an S-NSSAI or an NSI ID.

Step 805: determining, by the AMF entity, whether an intermediate SMF serving the UE exists in the network slice to which the PDU session belongs or not; if the intermediate SMF exists, performing the step 806; otherwise, performing the step 810.

Step 806: determining, by the AMF entity, whether the intermediate SMF entity may continue serving the UE; wherein two manners may be used by the AMF entity to determine whether the intermediate SMF entity may continue serving the UE or not.

A first, manner is as follows. The AMF entity requests the intermediate SMF entity to provide a service area of the intermediate SMF entity to the AMF entity; in this way, the AMF entity may determine, according to a current position of the UE being within the service area of the intermediate SMF entity, that the intermediate SMF entity may continue serving the UE or not; otherwise the AMF entity may determine that the intermediate SMF entity cannot continue serving the UE.

A second manner is as follows. The AMF entity transmits the location information of the UE to the intermediate SMF entity, and the intermediate SMF entity may determine, according to the current position of the UE being within the service area of the intermediate SMF entity, that the intermediate SMF entity may continue serving the UE, otherwise the intermediate SMF entity may determine that the intermediate SMF entity cannot continue serving the UE, and the intermediate SMF entity returns a result of the determination to the AMF entity.

Step 807: if the intermediate SMF entity may continue serving the UE, further determining, by the AMF entity, whether the anchor SMF entity corresponding to the PDU session and the intermediate SMF entity are the same or not.

Step 808: if they are the same, needing not to insert the intermediate SMF entity for the PDU session.

Step 809: if they are different, inserting, by the AMF entity, the intermediate SMF entity into the PDU session.

Step 810: if the intermediate SMF entity cannot continue serving the UE, querying, by the AMF entity, the NRF entity by using the location information of the UE and using information of the corresponding network slice if the current network supports the slice, to obtain a new intermediate SMF entity, and inserting the new intermediate SMF entity into the PDU session; wherein if the AMF entity queries the NRF entity and the anchor SMF entity is obtained, then the intermediate SMF entity does not need to be inserted for the UE.

Figure 9:
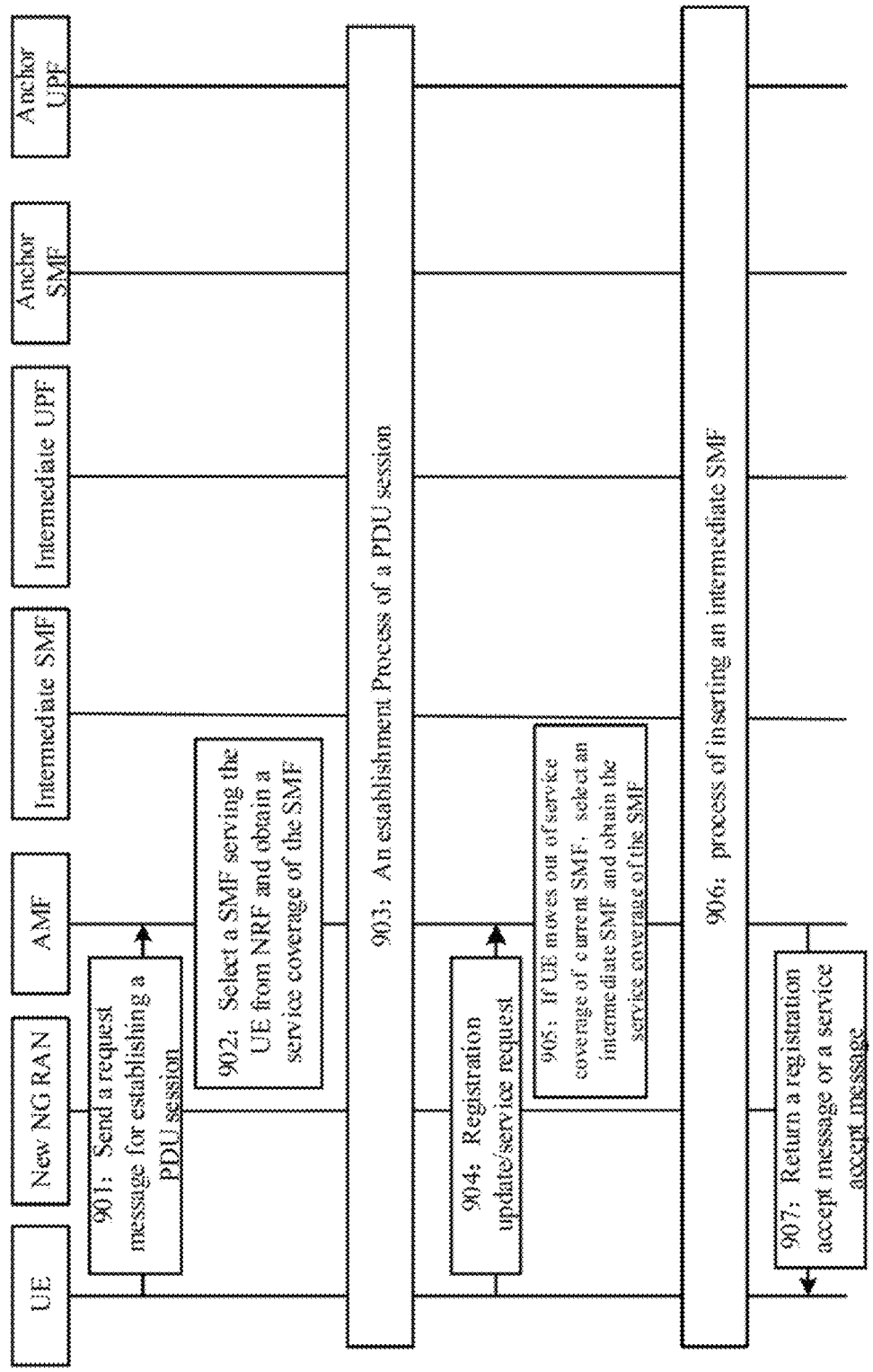
FIG. 9 is a flow chart illustrating a process of inserting a SMF entity of the present disclosure.

Referring to FIG. 9, FIG. 9 is a flow chart illustrating a process of inserting a SMF entity of the present disclosure. In this figure, the AMF entity determines that the UE moves out of a corresponding service area according to information of a service area of a SMF entity provided by the NRF entity. The process of inserting a SMF entity shown in FIG. 9 includes the following steps 901-907.

Step 901: sending, by a UE during a PDU session establishment process, a PDU session establishment request message to an AMF entity through a new NG RAN.

Step 902: after the AMF entity receives the PDU session establishment request message, selecting, by the AMF entity a SMF (as a PDU session anchor) according to information such as a position of the UE, the DNN and the like. Specifically, the AMF queries the NRF entity to obtain an appropriate SMF and a service area of the SMF.

Step 903: storing, by the AMF entity, information of the SMF and a service area obtained from the NRF entity, and utilizing the SMF to establish a PDU session.

Step 904: initiating, by the UE a registration update (a Registration Request) process due to movement of the UE, or initiating, by a UE in an idle state, service request process, or initiating a handover process (not shown).

Step 905: in the processes initiated by the UE and directed to each PDU session of the UE or each PDU session required to be activated in a user plane, determining, by the AMF entity according to a current position of the UE and a stored service area of a SMF serving the PDU session, whether the UE moves out of the service area of the current SMF, if the UE moves out of the service area of the current SMF, querying, by the AMF entity utilizing the position of the UE, the DNN and the like to, the NRF entity again to obtain a new SMF serving the PDU session, and returning, by the NRF entity, information of the new SMF and a service area of the SMF.

Step 906: if the AMF entity finds that the new SMF is different from the anchor SMF of the PDU session and information of an intermediate SMF has not been stored for the PDU session, utilizing, by the AMF entity, the newly obtained SMF as an intermediate SMF and inserting the intermediate SMF into the PDU session, and storing the information of the intermediate SMF and a service area of the intermediate SMF; or, if the AMF entity finds that the new SMF is different from the anchor AMF of the PDU session and information of an intermediate SMF has been stored for the PDU session, replacing, by the AMF entity, an original intermediate SMF in the PDU session with the newly obtained SMF as the intermediate SMF, and storing information of the new intermediate SMF and a service area of the new intermediate SMF, and deleting information of the original intermediate SMF and a service area of the original intermediate SMF; or if the AMF entity finds that the new SMF is the same as the anchor SMF of the PDU session and information of an intermediate SMF is stored for the PDU session, deleting, by the AMF entity, the intermediate SMF of the PDU session, and deleting the stored information of the intermediate SMF and a service area of the intermediate SMF.

Step 907: returning, by the AMF entity, a Registration Accept message or a Service Accept message to the UE.

The method of inserting an SMF of the present disclosure is explained in the above embodiments, and an AMF entity corresponding to the method of inserting an SMF of the present disclosure will be described below with reference to embodiments and die accompanying drawings.

Figure 10:
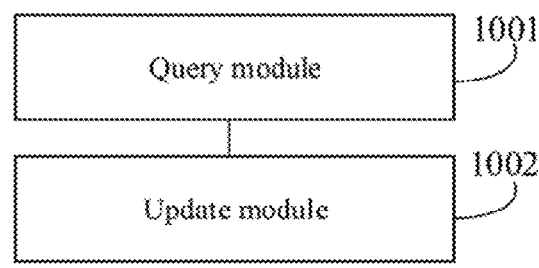
FIG. 10 is a structural schematic diagram illustrating an AMF entity of some embodiments of the present disclosure.

Referring to FIG. 10, some embodiments of the present disclosure also provides an AMF entity, and the AMF entity includes a query module 1001 and an update module 1002.

The query module 1001 is configured to: in a case that a User Equipment (UE) moves out of a service area of a first SMF entity currently serving a first Packet Data Unit (PDU) session of the UE, or in a case that selecting a SMF entity for the UE is needed, query, by using information relevant to the UE, a second SMF entity capable of serving the UE.

The update module 1002 is configured to update the first PDU session by using the second SMF entity.

The AMF entity of some embodiment of the present disclosure queries, by using information relevant to the UE, a second SMF entity capable of serving the UE in a case that the UE moves out of a service area of a first SMF entity currently serving a first Packet Data Unit (PDU) session of the UE, or in a case that selecting a SMF entity for the UE is needed; and updates the first PDU session of the UE by using the second SMF entity, so that querying of a SMF entity may be avoided every time a position of the UE is updated, and the AMF entity is prevented from frequently selecting a SMF entity, and a service area of the AMF entity and a service area of the SMF entity are not required to be consistent, thereby achieving an efficient insertion of the SMF entity.

Figure 11:
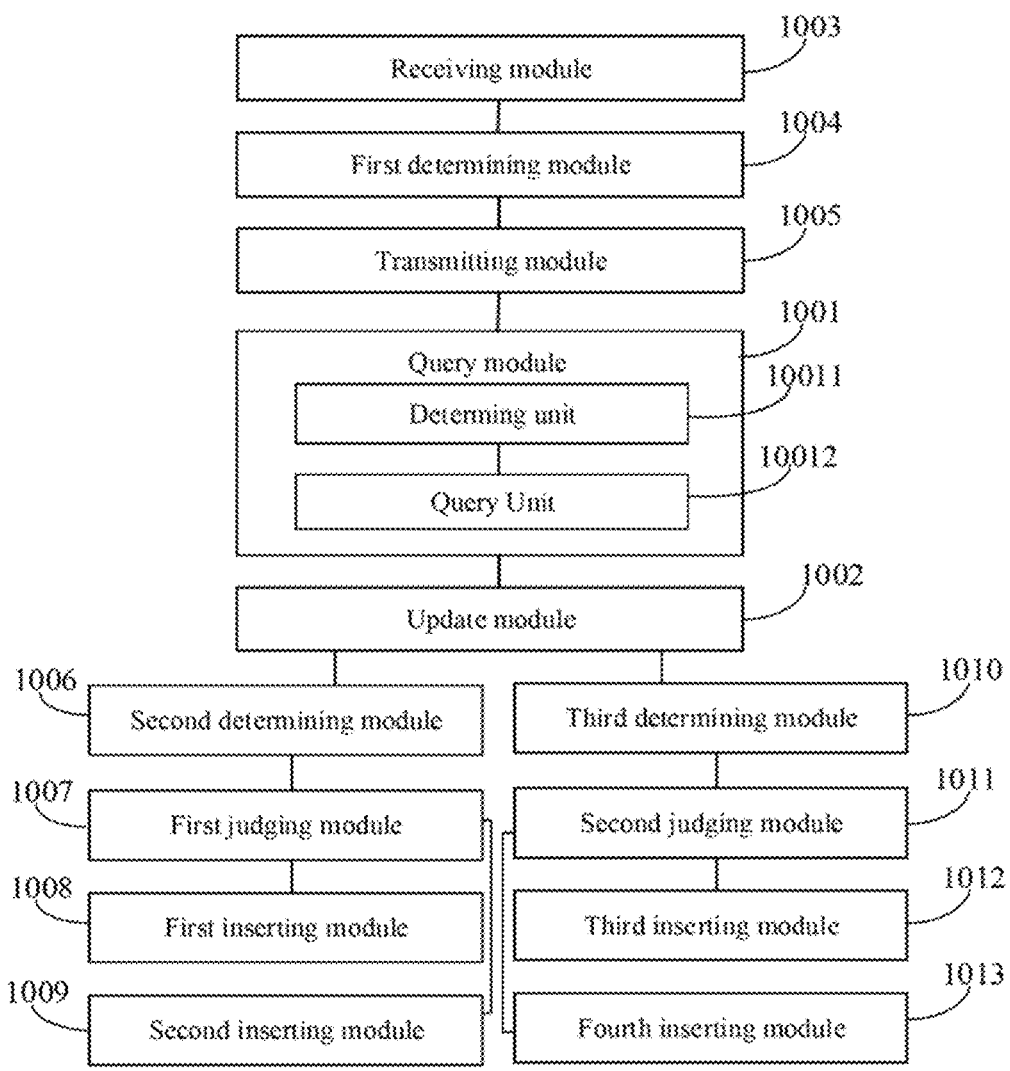
FIG. 11 is a structural schematic diagram illustrating an AMF entity of some embodiments of the present disclosure.

In some embodiments of the present disclosure, referring to FIG. 11, the query module 901 includes a determining unit 10011 and a query unit 10012. The determining unit 10011 is configured to: according to information provided by the first SMF entity, determine that the UE moves out of the service area of the first SMF entity, or determine that selecting a SMF entity for the UE is needed. The query unit 10012 is configured to query, using the information relevant to the UE, the second SMF entity capable of serving the UE.

Specifically, referring to FIG. 11, the AMF entity further includes: a receiving module 1003 and a first determining module 1004. The receiving module 1003 is configured to receive a registration request message sent by the UE, or receive a handover request or a path switch request message sent by a base station serving the UE. The first determining module 1004 is configured to determine information of the first PDU session of the UE, the information of the first PDU session including an identifier (ID) of the first SMF entity.

Specifically, referring to FIG. 11, the AMF entity further includes a transmitting module 1005 configured to provide location information of the UE to the first SMF entity.

Specifically, the first SMF entity includes an anchor SMF entity.

Specifically, the first SMF entity further includes a first intermediate SMF entity.

In some embodiments or the present disclosure, the determining unit 10011 is specifically configured to: according to indication information provided by the anchor SMF entity, determine that the UE moves out of a service area of the anchor SMF entity, or determine that selecting a SMF entity far the UE is needed; or according to indication information provided by the first intermediate SMF entity, determine that the UE moves out of a service area of the first intermediate SMF entity, or determine that selecting, a SMF entity for the UE is needed; or according to information of the service area of the first intermediate SMF entity and location information of the UE provided by the first intermediate SMF entity, determine that the UE moves out of the service area of the first intermediate SMF entity, or determine that selecting a SMF entity for the UE is needed.

Specifically, the indication information provided by the anchor SMF entity is determined, according to the location information of the UE provided by the AMF entity and information of the service area of the anchor SMF entity, by the anchor SMF entity. The indication information provided by the first intermediate SMF entity is determined by the first intermediate SMF entity according to the location information of the UE provided by the SMF entity and the information of the service area of the first intermediate SMF entity.

In some embodiments of the present disclosure, the query module 1001 is specifically configured to: query a NRF entity and obtain information of the second SMF entity, by using the information relevant to the UE; and determine the second SMF entity according to the information of the second SMF entity.

In some embodiments of the present disclosure, referring to FIG. 11, the AMF entity further includes a second determining module 1006, a first judging module 1007, a first inserting module 1008, and a second inserting module 1009. The second determining module 1006 is configured to determine that the second SMF entity is serving the UE in a network in a case that a registration request message sent by the UE, or a handover request or a path switch request message sent by a base station serving the UE is received. The first judging module 1007 is configured to judge whether the second SMF entity is still able to serve UE or not. The first inserting module 1008 is configured to, in a case that the second SMF entity is still able to serve the UE, and if an anchor SMF entity of the first PDU session differs from the second SMF entity, insert the second SMF entity into the first PDU session. The second inserting module 1009 is configured to, in a case that the second SMF entity is unable to serve the UE, query a third SMF entity capable of stirs firm the UE, and insert the third SMF entity into the first PDU session.

In some embodiments of the present disclosure, the information of the first PDU session further includes: information of a network slice to which the first PDU session belongs.

Further, referring to FIG. 11, the AMF entity further includes: a third determining module 1010, a second judging module 1011, a third inserting module 1012 and a fourth inserting module 1013. The third determining module 1010 is configured to, in a case that a registration request message sent by the UE, or a handover request or a path switch request message sent by a base station serving the UE is received, determine, according to information of a network slice to which the first PDU session belongs, that the second SMF entity is serving the UE in the network slice to which the first PDU session belongs. The second judging module 1011 is configured to judge whether the second SMF entity is still able to continue providing a service or not. The third inserting, module 1012 is configured to: in a case that the second SMF entity is still able to serve the UE, and if an anchor SMF entity of the first PDU session differs from the second SMF entity, insert the second SMF entity into the first PDU session. The fourth inserting module 1013 is configured to, in a case that the second SMF entity is unable to continue providing the service, query a fourth SMF entity capable of serving the UE, and insert the fourth SMF entity into the first PDU session.

In some embodiments of the present disclosure, the AMF entity may further include a fourth determining module and a fifth inserting module. The fourth determining module is configured to determine that the second SMF entity is serving the UE in a network. The fifth inserting module is configured to, in a case that the UE moves out of a service area of a fifth SMF entity currently serving a second PDU session of the UE, or in a case that selecting a SMF entity for the UE is needed, insert the second SMF entity into the second PDU session.

Further, the AMF entity may further include a fifth determining module, a sixth determining module, a seventh determining module, and a sixth inserting module. The fifth determining module is configured to determine information of a network slice to which the first PDU session belongs. The sixth determining module is configured to determine, according to the information of the network slice to which the first PDU session belongs, that a second PDU session of the UE exists in the network slice to which the first PDU session belongs. A seventh determining module is configured to determine that the second SMF entity is serving the UE in the network slice to which the first PDU session belongs. The sixth inserting module is configured to, in a case that the UE moves out of a service area of a sixth SMF entity currently serving the second PDU session, or in a case that selecting a SMF entity for the UE is needed, insert the second SMF entity into the second PDU session.

Figure 12:
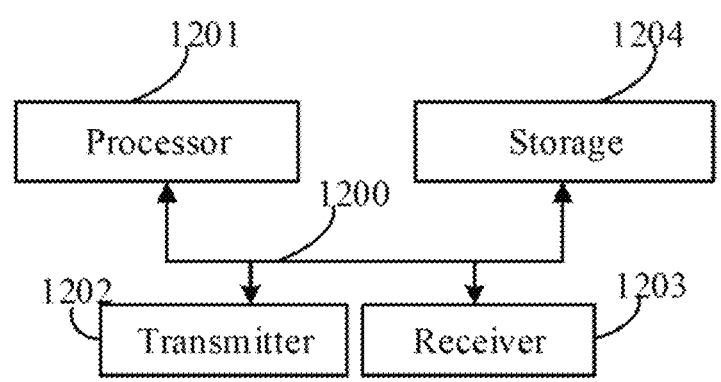
FIG. 12 is a structural schematic diagram illustrating an AMF entity of some embodiments of the present disclosure.

Referring to FIG. 12, some embodiments of the present disclosure further provides an AMF entity, and the AMF entity includes a processor 1201, a transmitter 1202, a receiver 1203 and a storage 1204.

The processor 1201 is configured to: in a case that a User Equipment (UE) moves out of a service area of a first SMF entity currently serving a first Packet Data Unit (PDU) session of the UE, or in, a case that selecting a SMF entity for the UE is needed, query, by using information relevant to the UE, a second SMF entity capable of serving the UE and update the first PDU session by using the second SMF entity.

The AMF entity of some embodiment of the present disclosure queries, by using information relevant to the UE, a second SMF entity capable of serving the UE in a case that the UE moves out of a service area of a first SMF entity currently serving a first Packet Data Unit (PDU) session of the UE, or in a case that selecting a SMF entity for the UE is needed; and updates the first PDU session of the UE by using the second SMF entity, so that querying of a SMF entity may be avoided every time a position of the UE is updated, and the AMF entity is prevented from frequently selecting a SMF entity, and a service area of the AMF entity and a service area of the SMF entity are not required to be consistent, thereby achieving an efficient insertion of the SMF entity.

In some embodiments of the present disclosure, optionally, the processor 1201 is further configured to: according to information provided by the first SMF entity, determine that the UE moves out of the service area of the first SMF entity, or determine that selecting a SMF entity for the UE is needed; and query, using the information relevant to the UE, the second SMF entity capable of serving the UE.

Optionally, the receiver 1203 is configured to receive a registration request message sent by the UE, or receive a handover request or a path switch request message sent by a base station serving the UE.

The processor 1201 is further configured to: determine information of the first. PDU session of the UE, wherein the information of the first PDU session includes an identifier (ID) of the first SMF entity.

Optionally, the transmitter 1202 is configured to provide location information of the UE to the first SMF entity.

Optionally, the first SMF entity includes an anchor SMF entity.

Optionally, the first SMF entity further includes a first intermediate SMF entity.

Optionally, the processor 1201 is further configured to: according to indication information provided by the anchor SMF entity, determine that the UE moves out of a service area of the anchor SMF entity, or determine that selecting a SMF entity for the UE is needed; or according to indication information provided by the first intermediate SMF entity, determine that the UE moves out of a service area of the first intermediate SMF entity, or determine that selecting a SMF entity for the UE is needed; or according to information of the service area of the first intermediate SMF entity and location information of the UE provided by the first intermediate SMF entity, determine that the UE moves out of the service area of the first intermediate SMF entity, or determine that selecting a SMF entity for the UE is needed.

Optionally, the indication information provided by the anchor SMF entity is determined, according to the location information of the UE provided by the AMF entity and information of the service area of the anchor SMF entity, by the anchor SMF entity. The indication information provided by the first intermediate SMF entity is determined by the first intermediate SMF entity according to the location information of the UE provided by the AMF entity and the information of the service area of the first intermediate SMF entity.

Optionally, the processor 1201 is further configured to: query a NRF entity and obtain information of the second SMF entity, by using the information relevant to the UE; and determine the second SMF entity according to the information of the second SMF entity.

Optionally, the processor 1201 is further configured to: determine that the second SMF entity is serving the UE in a network in a case that a registration request message sent by the UE, or a handover request or a path switch request message sent by a base station serving the UE is received; judge whether the second SMF entity is still able to serve the UE or not; and in a case that the second SMF entity is still able to serve the UE, and if an anchor SMF entity of the first PDU session differs from the second SMF entity, insert the second SMF entity into the first PDU session; and, in a case that the second SMF entity is unable to continue providing the service, query a third SMF entity capable of serving the UE, and insert the third SMF entity into the first PDU session.

Optionally, the information of the first PDU session further includes: information of a network slice to which the first PDU session belongs.

Optionally, the processor 1201 is further configured to: in a case that a registration request message sent by the UE, or a handover request or a path switch request message sent by a base station serving the UE is received, determine, according to information of a network slice to which the first PDU session belongs, that the second SMF entity is serving the UE in the network slice to which the first PDU session belongs; judge whether the second SMF entity is still able to serve the UE or not; in a case that the second SMF entity is still able to serve the UE, and if, an anchor SMF entity of the first PDU session differs from the second SMF entity, insert the second SMF entity into the first PDU session; in a case that the second SMF entity is unable to continue providing the service, query a fourth SMF entity capable of serving the UE, and insert the fourth SMF entity into the first PDU session.

Optionally, the processor 1201 is further configured to; determine that the second SMF entity is serving the UE in a network; and in a case that the UE moves out of a service area of a fifth SMF entity currently serving a second PDU session of the UE, or in a case that selecting a SMF entity for the UE is needed, insert the second SMF entity into the second PDU session.

Optionally, the processor 1201 is further configured to: determine information of a network slice to which the first PDU session belongs; determine, according to the information of the network slice to which the first PDU session belongs, that a second PDU session of the UE exists in the network slice to which the first PDU session belongs; determine that the second SMF entity is serving the UE in the network slice to which the first PDU session belongs; and in a case that the UE moves out of a service area of a sixth SMF entity currently serving the second PDU session, or in a case that selecting a SMF entity for the UE is needed, insert the second SMF entity into the second PDU session.

Optionally, the processor 1201 is further configured to: according to information of a service area of the first SMF entity provided by the NRF, determine that the UE moves out of the service area of the first SMF entity; and query the second SMF entity capable of serving the UE by using the information relevant to the UE.

Optionally, the processor 1201 is further configured to: obtain and store the information of the service area of the first SMF entity provided by the NRF entity; and determine, according to the information of the service area of the first SMF entity during a registration update process, a service request process, or a handover process of the UE, that the UE moves out of the service area of the first SMF entity.

Optionally, the processor 1201 is further configured to: query the NRF entity by using the information relevant to the UE, and acquire information of the second SMF entity; and determine the second SMF entity according to the information of the second SMF entity.

Optionally, the information of the second SMF entity includes information of the service area of the second SMF entity; wherein the processor 1201 is configured to: store the information of the service area of the second SMF entity, and delete the information of the service area of the first SMF entity.

In FIG. 12, a bus architecture (represented by a bus 1200), the bus 1200 may include any number of interconnected buses and bridges, and the bus 1200 connects various circuits such as one or more processors represented by a processor 1201 and a storage represented by the storage 1204. A transmitter 1202 and a receiver 1203 may be a transceiving interface, and the transmitter 1202 and the receiver 1203 may be coupled to the processor 1201 and the storage 1204 via the bus 1200.

The processor 1201 is responsible for managing the bus 1200 and the usual processing, and the storage 1204 may be used to store data used by the processor 1201 in a case that the processor 1201 performs operations.

Some embodiments of the present disclosure further provide an AMF entity. The AMF entity includes a processor, a storage and a computer program stored in the storage and executable by the processor, wherein when the computer program is executed by the processor, the processor implements various process of the method embodiment for inserting an SMF, and the same technical effect may be achieved, and which will not be described herein to avoid repetition.

Figure 13:
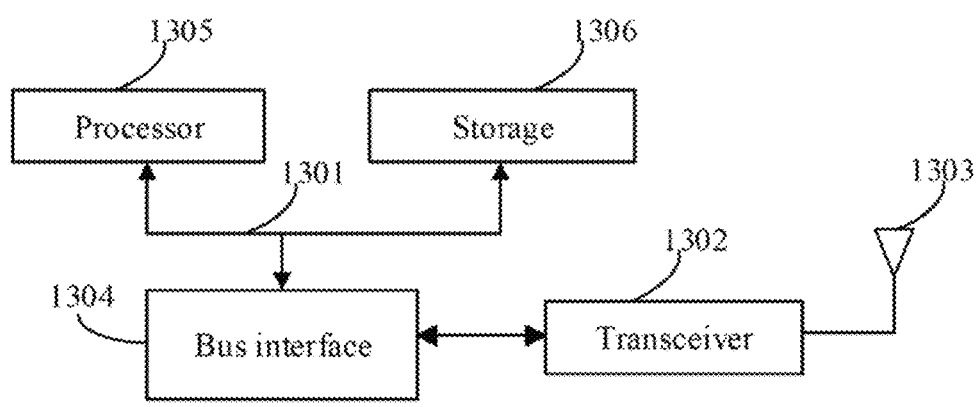
FIG. 13 is a structural schematic diagram illustrating an AMF entity of some embodiments of the present disclosure.

Specifically referring to FIG. 13, some embodiments of the present disclosure further provide an AMF entity, and the AMF entity includes a bus 1301, a transceiver 1302, an antenna 1303, a bus interface 1304, a processor 1305 and a storage 1306.

The processor 1305 is configured to read a program in the storage 1306 to perform the method of inserting an SMF shown in FIG. 1 to FIG. 9 above. Specifically, the processor 1305 may read the program in the storage 1306 to perform the following processes: in a case that a User Equipment (UE) moves out of a service area of a first SMF entity currently serving a first Packet Data Unit (PMU) session of the UE, or in a case that selecting a SMF entity for the UE is needed, querying, by using information relevant to the UE, a second SMF entity capable of serving the UE; and updating the first PDU session by using the second SMF entity.

The transceiver 1302 is configured to receive and transmit data under a control of the processor 1305.

In FIG. 13, a bus architecture (represented by a bus 1301), the bus 1301 may include any number of interconnected buses and bridges, and the bus 1301 connects various circuits such as one or more processors represented by a processor 1305 and a storage represented by a storage 1306 together. The bus 1301 may also connect various other circuits together, such as peripherals, voltage regulators, power management circuits and the like, which are known in the art, therefore, will not be further described herein. A bus interface 1304 provides an interface between the bus 1301 and the transceiver 1302. The transceiver 1302 may be one component, or may be a plurality of components, such as multiple receivers and multiple transmitters, configured to provide a unit for communicating with various other devices on a transmission medium. Data processed by the processor 1305 is transmitted on a wireless medium through an antenna 1303. Further, the antenna 1303 further receives data and transmits data to the processor 1305.

The processor 1305 is responsible for managing the bus 1301 and a general processing, and may also provide various functions including timing, peripheral interfaces, voltage regulation, power management, and other control functions. The storage 1306 may be used to store data used by the processor 1305 when the processor 1305 performs operations.

Optionally, the processor 1305 may be a Central Processing Unit (CPU), an Application Specific Integrated Circuit (ASIC), a Field Programmable Gate Array (FPGA), or a Complex Programmable Logic Device (CPLD).

Some embodiments of the present disclosure further provides a computer readable storage medium having a computer program stored thereon, wherein when the computer program is executed by a processor, the process implements various processes of the method of inserting an SMF shown in FIG. 1 to FIG. 9 of the present disclosure or function of various module of the AMF entity of present disclosure, and the same technical effect may be achieved, and which will not be described herein to avoid repetition.

A computer readable medium may be a volatile or non-volatile, removable or non-removable medium implemented in any method or technology for storage of information such as computer readable instructions, data structures, program modules or other data. A computer storage medium includes, but is not limited to, a Phase Random Access Memory (PRAM), a Static RAM (SRAM), a Dynamic RAM (DRAM), other types of RAMs, a Read Only Memory (ROM), an Electrically Erasable Programmable ROM (EE-PROM), a flash memory or other memory technology, a Compact Disc Read-Only Memory (CD-ROM), a Digital Versatile Disks (DVD) or other optical storage, a magnetic cassettes, a magnetic tape, a magnetic disk storage or other magnetic storage devices, or any other non-transmission medium that may be used to store information accessed by a computing device. As defined herein, the computer readable medium does not include transitory computer readable media, such as modulated data signals and carriers.

It should be noted that, in the article, such terms as "comprise" or "include" or any other variations thereof are intended to encompass a non-exclusive inclusion, such that a process, a method, an article, or a device that includes a plurality of elements includes not only, those elements but also other elements not explicitly listed, or elements that are inherent to such a process, a method, an article, or a device. An element defined by a phrase "comprising a . . . " does not exclude presence of additional identical elements in the process, the method, the article, or the device including the element, if without further limitation.

A serial number of some embodiments of the present disclosure are merely for the description, and do not represent advantages and disadvantages of the embodiments.

From the embodiments described above, one skilled in the art may clearly understand that the disclosed methods and systems may be implemented using software and an essential universal hardware platform, of courses, only hardware is possible, to implement the methods and the systems. However, in some circumstances, the former is optimums. Based on such understanding, a technical solution of the present disclosure may be implemented in a form of software products which are stored in a non-volatile storage medium (e.g., a ROM/RAM, a disk, or a compact disc). The software includes instructions for a terminal device (e.g., a mobile phone, a personal computer, a server, an air-conditioner or a networked device, etc.) to execute the method described in the embodiments in the present disclosure.

The above are only optional embodiments of the present disclosure, and it should be noted that those skilled in the art may also make improvements and embellishments without departing from the principle of the present disclosure, and the improvements and the embellishments are also be within a protection range of the present disclosure.

What is claimed is:

1. A method of inserting a Session Management Function (SMF), the method being applied for an Access and Mobility Management Function (AMF) entity and comprising:
    in a case that a User Equipment (UE) moves out of a service area of a first SMF entity currently serving a first Packet Data Unit (PDU) session of the UE, or in a case that selecting a SMF entity for the UE is needed, querying, by using information relevant to the UE, a second SMF entity capable of serving the UE; and
    updating the first PDU session by using the second SMF entity,
    wherein in a case that the UE moves out of the service area of the first SMF entity currently serving the first PDU session of the UE, or in a case that selecting the SMF entity for the UE is needed, querying, by using information relevant to the UE, the second SMF entity capable of serving the UE, comprises:
        determining that the UE moves out of the service area of the first SMF entity according to information of the service area of the first SMF entity provided by a Network Repository Function (NRF) entity; and
        querying, by using the information relevant to the UE, the second SMF entity capable of serving the UE;
    wherein
        determining that the UE moves out of the service area of the first SMF entity according to information of the service area of the first SMF entity provided by the NRF entity, comprises:
            obtaining and storing the information of the service area of the first SMF entity provided by the NRF entity; and
            determining, according to the information of the service area of the first SMF entity during a registration update process, a service request process, or a handover process of the UE, that the UE moves out of the service area of the first SMF entity;
    before in a case that the UE moves out of the service area of the first SMF entity currently serving the first PDU session of the UE, or in a case that selecting a SMF entity for the UE is needed, querying, by using information relevant to the UE, the second SMF entity capable of serving the UE, the method further comprises:
receiving a registration request message or a service request message sent by the UE, or a handover request or a path switch request message sent by a base station serving the UE; and
determining information of the first PDU session of the UE, wherein the information of the first PDU session comprises an identifier (ID) of the first SMF entity and information of a network slice to which the first PDU session belongs.

2. The method according to claim 1, further comprising: providing location information of the UE to the first SMF entity.

3. The method according to claim 1, wherein the first SMF entity comprises an anchor SMF entity or a first intermediate SMF entity.

4. The method according to claim 1, wherein in a case that a registration request message or a service request message sent by the UE is further received, or a handover request or a path switch request message sent by a base station serving the UE is received, the method further comprises:
determining that the second SMF entity is serving the UE in a network; and
judging whether the second SMF entity is still able to serve the UE or not;
wherein, in a case that the second SMF entity is still able to serve the UE, and if an anchor SMF entity of the first PDU session differs from the second SMF entity, then the second SMF entity is inserted into the first PDU session;
in a case that the second SMF entity is unable to continue providing the service, a third SMF entity capable of serving the UE is queried, and the third SMF entity is inserted into the first PDU session.

5. The method according to claim 1, wherein, in a case that a registration request message or a service request message sent by the UE is further received, or a handover request or a path switch request message sent by a base station serving the UE is received, the method further comprises:
determining, according to information of the network slice to which the first PDU session belongs, that the second SMF entity is serving the UE in the network slice to which the first PDU session belongs; and
judging whether the second SMF entity is still able to serve the UE or not;
wherein, in a case that the second SMF entity is still able to serve the UE, and if an anchor SMF entity of the first PDU session differs from the second SMF entity, then the second SMF entity is inserted into the first PDU session; in a case that the second SMF entity is unable to continue providing the service, a fourth SMF entity capable of serving the UE is queried, and the fourth SMF entity is inserted into the first PDU session.

6. The method according to claim 1, further comprising:
determining that the second SMF entity is serving the UE in a network; and
in a case that the UE moves out of a service area of a fifth SMF entity currently serving a second PDU session of the UE, or in a case that selecting a SMF entity for the UE is needed, inserting the second SMF entity into the second PDU session.

7. The method according to claim 1, further comprising:
determining, according to the information of the network slice to which the first PDU session belongs, that a second PDU session of the UE exists in the network slice to which the first PDU session belongs;
determining that the second SMF entity is serving the UE in the network slice to which the first PDU session belongs;
in a case that the UE moves out of a service area of a sixth SMF entity currently serving the second PDU session, or in a case that selecting a SMF entity for the UE is needed, inserting the second SMF entity into the second PDU session.

8. The method according to claim 1, wherein querying, by using the information relevant to the UE, the second SMF entity capable of serving the UE, comprises:
querying, using the information relevant to the UE, the NRF entity, and obtaining information of the second SMF entity; and
determining the second SMF entity according to the information of the second SMF entity.

9. The method according to claim 8, wherein the information of the second SMF entity comprises information of a service area of the second SMF entity;
after determining the second SMF entity according to the information of the second SMF entity, the method further comprises:
storing the information of the service area of the second SMF entity, and deleting the information of the service area of the first SMF entity.

10. An Access and Mobility Management Function (AMF) entity, comprising:
a query circuit, configured for, in a case that a User Equipment (UE) moves out of a service area of a first SMF entity currently serving a first Packet Data Unit (PDU) session of the UE, or in a case that selecting a SMF entity for the UE is needed, querying, by using information relevant to the UE, a second SMF entity capable of serving the UE; and
an update circuit, configured for updating the first PDU session by using the second SMF entity,
wherein in a case that the UE moves out of the service area of the first SMF entity currently serving the first PDU session of the UE, or in a case that selecting the SMF entity for the UE is needed, querying, by using information relevant to the UE, the second SMF entity capable of serving the UE, comprises:
determining that the UE moves out of the service area of the first SMF entity according to information of the service area of the first SMF entity provided by a Network Repository Function (NRF) entity; and
querying, by using the information relevant to the UE, the second SMF entity capable of serving the UE;
wherein
determining that the UE moves out of the service area of the first SMF entity according to information of the service area of the first SMF entity provided by the NRF entity, comprises:
obtaining and storing the information of the service area of the first SMF entity provided by the NRF entity; and
determining, according to the information of the service area of the first SMF entity during a registration update process, a service request process, or a handover process of the UE, that the UE moves out of the service area of the first SMF entity,
wherein the AMF entity further comprises:
a receiving circuit, configured to receive a registration request message or a service request message sent by the UE, or receive a handover request or a path switch request message sent by a base station serving the UE; and a first determining circuit, configured to determine information of the first PDU session of the UE, wherein the information of the first PDU session comprises an identifier (ID) of the first SMF entity and information of a network slice to which the first PDU session belongs.

11. An AMF entity, comprising a processor, a storage and a computer program stored on the storage and executable by the processor, wherein, in a case that the computer program is executed by the processor, the processor implements steps of the method of inserting an SMF according to claim 1.

12. A non-transitory computer readable storage medium, comprising:

a computer program stored on the non-transitory computer readable storage medium, wherein in a case that the computer program is executed by a computer processor, the computer processor implements steps of the method of inserting an SMF according to claim 1.

* * * * *